[12] United States Patent  
Neil et al.

(10) Patent No.: US 7,779,085 B2
(45) Date of Patent: Aug. 17, 2010

(54) AUTOMATIC MOBILE DEVICE CONFIGURATION

(75) Inventors: Tim Neil, Mississauga (CA); Steve Grenier, Georgetown (CA); Scott Neil, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 868 days.

(21) Appl. No.: 11/457,841

(22) Filed: Jul. 17, 2006
(Under 37 CFR 1.47)

(65) Prior Publication Data

US 2008/0016187 A1 Jan. 17, 2008

(51) Int. Cl.
G06F 15/16 (2006.01)
G06F 15/177 (2006.01)
G06F 9/46 (2006.01)
G06F 9/445 (2006.01)
G06F 3/14 (2006.01)
G06F 9/24 (2006.01)
G06F 3/00 (2006.01)
G06F 13/00 (2006.01)
G06F 9/44 (2006.01)
G06F 9/45 (2006.01)
G06F 9/00 (2006.01)
G06F 1/24 (2006.01)

(52) U.S. Cl. ........................ 709/217; 709/220; 709/221; 709/222; 709/249; 718/101; 719/316; 717/147; 717/148; 717/172; 717/177; 715/748; 715/749; 715/864; 713/1; 713/2; 713/100

(58) Field of Classification Search ................ 709/203, 709/207, 217–220, 236, 249, 221, 222; 719/316; 717/147, 148, 172, 177; 715/748, 749, 864; 718/101; 713/1, 2, 100
See application file for complete search history.

(56) References Cited

U.S. PATENT DOCUMENTS 6,640,244 B1 * 10/2003 Bowman-Amuah ......... 709/207

(Continued)

FOREIGN PATENT DOCUMENTS

WO 03090492 A1 10/2003

(Continued)

OTHER PUBLICATIONS

"SyncML Device Management Security, Version 1.1.2," Open Mobile Alliance, OMA-SyncML-DMSecurity-V1_1_2-20031209-A, Dec. 9, 2003.

(Continued)

Primary Examiner—Vivek Srivastava
Assistant Examiner—Melvin H Pollack
(74) Attorney, Agent, or Firm—Eckert Seamans Cherin & Mellott, LLC; Brij K. Agarwal, Esq.

(57) ABSTRACT

A remote wireless device registers with a server. Responsively, the server determines the identity of a server-side application associated with a user of the remote wireless device. The server may then generate an application definition file specific to the server-side application and to the remote wireless device. The application definition file may contain definitions for: a user interface format; a format for network messages; and a format for storing data. Using these definitions, the wireless device may receive data generated by the server-side application and formatted in accordance with the definitions. The wireless device may then present a user interface for the server-side application. The application definition file may be an Extensible Markup Language (XML) file. Advantageously, configuration of devices is more efficiently accomplished.

19 Claims, 17 Drawing Sheets

U.S. PATENT DOCUMENTS

| | | | |
|---|---|---|---|
| 6,687,745 B1 * | 2/2004 | Franco et al. | 709/219 |
| 6,718,540 B1 * | 4/2004 | Azua et al. | 717/148 |
| 6,904,449 B1 * | 6/2005 | Quinones | 709/203 |
| 7,257,819 B1 * | 8/2007 | Dixon et al. | 719/316 |
| 7,295,522 B2 * | 11/2007 | Shell et al. | 370/252 |
| 7,302,609 B2 * | 11/2007 | Matena et al. | 714/15 |
| 7,376,933 B2 * | 5/2008 | Gerken et al. | 717/106 |
| 7,398,305 B2 * | 7/2008 | Bodin et al. | 709/222 |
| 7,461,373 B2 | 12/2008 | Herle et al. | |
| 7,478,097 B2 * | 1/2009 | Emeis et al. | 707/10 |
| 7,529,197 B2 * | 5/2009 | Shell et al. | 370/254 |
| 7,577,751 B2 * | 8/2009 | Vinson et al. | 709/231 |
| 7,584,225 B2 * | 9/2009 | Jiang et al. | 707/204 |
| 2003/0027581 A1 | 2/2003 | Jokinen et al. | |
| 2003/0060896 A9 * | 3/2003 | Hulai et al. | 700/1 |
| 2003/0069871 A1 * | 4/2003 | Yucel | 706/60 |
| 2003/0101246 A1 * | 5/2003 | Lahti | 709/221 |
| 2003/0208595 A1 * | 11/2003 | Gouge et al. | 709/225 |
| 2004/0235463 A1 | 11/2004 | Patel et al. | |
| 2005/0108678 A1 * | 5/2005 | Goodwin et al. | 717/100 |
| 2006/0173994 A1 * | 8/2006 | Emeis et al. | 709/224 |
| 2006/0294526 A1 * | 12/2006 | Hambrick et al. | 719/315 |
| 2007/0016696 A1 * | 1/2007 | Jerrard-Dunne et al. | 709/250 |
| 2007/0244926 A1 * | 10/2007 | Vitanov et al. | 707/104.1 |
| 2007/0250783 A1 * | 10/2007 | Wu et al. | 715/762 |
| 2008/0189358 A1 * | 8/2008 | Charles | 709/203 |
| 2009/0137202 A1 * | 5/2009 | Fujimaki et al. | 455/3.01 |

FOREIGN PATENT DOCUMENTS

| | | |
|---|---|---|
| WO | 2004088950 A1 | 10/2004 |
| WO | 2006/019503 A1 | 2/2006 |

OTHER PUBLICATIONS

"SyncML Device Management Standardized Objects, Version 1.1.2," Open Mobile Alliance, OMA-SyncML-DMStdObj-V1_1_2-20031203-A, Dec. 3, 2003.

* cited by examiner

```
72 ⎰ <ARML>
   ⎱     <HEAD>_</HEAD>
         <SYS>
                 <QUERY>
                         <PLATFORMS>
                                 <PLATFORM>WinCE</PLATFORM>
                         </PLATFORMS>
                 </REG>
         </SYS>
    </ARML>
```

```
74 ⎰ <ARML>
   ⎱     <HEAD>_</HEAD>
         <SYS>
                 <QUERYRESP>
                         <APP>Order Entry</APP>
                         <APP>Helpdesk</APP>
                         <APP>Engineer Dispatch</APP>
                 </QUERYRESP>
         </SYS>
    </ARML>
```

```
76 ⎰ <ARML>
   ⎱     <HEAD>_</HEAD>
         <SYS>
                 <REG TYPE="ADD">
                         <CLIENTID>SUNTRESS</CLIENTID>
                         <MOBILEID>867452</MOBILEID>
                         <NEWMOBILEID>268625</NEWMOBILEID>
                         <PLATFORMS>
                                 <PLATFORM>WinCE</PLATFORM>
                         </PLATFORMS>
                 </REG>
         </SYS>
    </ARML>
```

```
78 ⎰ <ARML>
   ⎱     <HEAD>_</HEAD>
         <SYS>
                 <REGCONFIRM TYPE="ADD">
                         <MOBILEID>268625</MOBILEID>
                         <VALUE>CONFIRM</VALUE>
                         <INTERFACE>
                             <BUTTONS NUM="1">
                                 <BTN NAME="OK" CAPTION="Send" INDEX="0">
                                 </BTN>
                             </BUTTONS>
                             <EDITBOXES NUM="3">
                                 <E3 NAME="To" INDEX="1"></E3>
                                 <E3 NAME="Subject" INDEX="2"></E3>
                                 <E3 NAME="Body" INDEX="3"></E3>
                             </EDITBOXES>
                         </INTERFACE>
                 </REGCONFIRM>
         </SYS>
    </ARML>
```

FIG. 11

```
<SCREEN NAME="NewMsg" CAPTION="CEMobile">
  <BUTTONS>
    <BTN NAME="OK" CAPTION="Send" X="0" Y="15" HT="18" WT="50">   ← D
      <EVENTS>
        <EVENT TYPE="BUTTONCLICK">
          <ACTION TYPE="SAVE"/>
          <ACTION TYPE="ARML">
            <ARMLTEXT>
              <PKG TYPE="ME">
                <MAIL MSGID="1" FROM="[Sys.UserName]" SUBJECT="[NewMsg.Subject]">
                  <DATA>[NewMsg.Body]</DATA>
                </MAIL>
                <RECIPS>
                  <RCP MSGID="1" TO="[NewMsg.To]"/>
                </RECIPS>
              </PKG>
            </ARMLTEXT>
          </ACTION>
        </EVENT>
      </EVENTS>
    </BTN>
  </BUTTONS>
  <EDITBOXES>
    <EB NAME="To" CAPTION="To:" SAVE="TRUE" SAVENAME="To" X="0" Y="30" HT="18" WT="50" />        ← A
    <EB NAME="Subject" CAPTION="Subject:" SAVE="TRUE" SAVENAME="Subject" X="0" Y="45" HT="18" WT="50"/>  ← B
    <EB NAME="Body" CAPTION="Body:" SAVE="TRUE" SAVENAME="Body" X="0" Y="60" HT="60" WT="50"/>          ← C
  </EDITBOXES>
</SCREEN>
```
⎫
⎬ 92
⎭

FIG. 13

```
<PKG TYPE="ME"
  <MAIL MSGID="1" FROM="Tim Neil" FROMADDRESS="timn@nextair.com" SUBJECT="Hello Back">
    <DATA>I am responding to your message</DATA>
  </MAIL>
  <RECIPS>
    <RCP MSGID="1" ADDRESS="steven@nextair.com"></RCP>
  </RECIPS>
</PKG>
```
⎫
⎬ 94
⎭

FIG. 14

```
<TDEF NAME="SENTITEMS" UPDATETYPE=NEW PK=LNGMESSAGEID DELINDEX=2>
  <FIELDS>
    <FLD TYPE="INT"    SIZE="0"   INDEXED="NO"  ALLOWNULL="NO">LNGMESSGEID</FLD>
    <FLD TYPE="STRING" SIZE="200" INDEXED="NO"  ALLOWNULL="YES">VARFROM</FLD>
    <FLD TYPE="MEMO"   SIZE="0"   INDEXED="YES" ALLOWNULL="YES">MEMBODY</FLD>
    <FLD TYPE="STRING" SIZE="200" INDEXED="NO"  ALLOWNULL="YES">VARSUBJECT</FLD>
  </FIELDS>
</TDEF>
<TDEF NAME="RECIPIENTS" UPDATTYPE=NEW PK=LNGRECIPIENTID DELINDEX=1>
  <FIELDS>
    <FLD TYPE="INT" SIZE="AUTOINC" INDEXED="NO" ALLOWNULL="NO">LNGRECIPIENTID</FLD>
    <FLD TYPE="INT" SIZE="0" INDEXED="YES" REFERENCFIELD="SENTITEMS (MESSAGEID)"
         ALLOWNULL="NO">LNGMESSAGEID</FLD>
    <FLD TYPE="STRING" SIZE="200" INDEXED="NO" ALLOWNULL="YES">VARADDRESS</FLD>
  </FIELDS>
</TDEF>
```

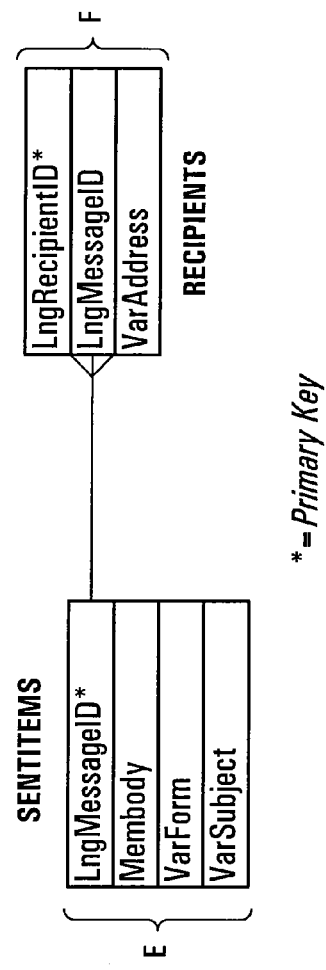

FIG. 15B

\* = *Primary Key*

```
<AXDATAPACKET BODY="ME" SENDTOMOBILE="NO" SENDTOAPP="YES">
  <TABLEUPDATES>

<TUPDATE TABLE="SENTITEMS" UPDATETYPE="ADD" WHERETYPE="PROP"
      SECTION="MAIL" MULTIROW="NO"">
      <FIELDS>
        <PKGFLD NAME="LNGMESSAGEID" PARAMTYPE="PROP">MSGID</PKGFLD>
        <PKGFLD NAME="VARFROM" PARAMTYPE="PROP">FROM</PKGFLD>
        <PKGFLD NAME="VARSUBJECT" PARAMTYPE="PROP">SUBJECT</PKGFLD>
        <PKGFLD NAME="MEMBODY" PARAMTYPE="VALUE">DATA</PKGFLD>
      </FIELDS>
    </TUPDATE>

<TUPDATE TABLE="RECIPIENTS" UPDATETYPE="ADD" WHERETYPE="PROP"
      SECTION="RECIPS" MULTIROW="YES" MULTIROWIDENT="RCP">
      <FIELDS>
        <PKGFLD NAME="LNGMESSAGEID" PARAMTYPE="PROP">MSGID</PKGFLD>
        <PKGFLD NAME="VARFULLNAME" PARAMTYPE="PROP">TO</PKGFLD>
        <PKGFLD NAME="VARADDRESS" PARAMTYPE="PROP">ADDRESS</PKGFLD>
      </FIELDS>
    </TUPDATE>

</TABLEUPDATES>
</AXDATAPACKET>
```

FIG. 15C

AUTOMATIC MOBILE DEVICE CONFIGURATION

FIELD OF TECHNOLOGY

The present disclosure relates to software, devices and methods allowing varied mobile devices to interact with server-side software applications and, more particularly, to the automatic configuration of such mobile devices.

BACKGROUND

Wireless connectivity is a feature of the modern telecommunications environment. An increasing range of people are using a wide variety of wireless data networks to access corporate data applications.

However, there are numerous competing mobile devices (also referred to as "mobile communication devices") that can be used to achieve this. Each device has its own operating system and its own display characteristics. Operating systems are not mutually compatible, nor are the display characteristics—some are color, some are black and white, some are text-only, some are pictorial.

At the same time, an increasing number of mobile device users are people without a technical background or high level of educational achievement. Such people are often intimidated by the need to run complex installation programs. Furthermore, at present, such installation programs generally depend on cable connections to a personal computer by the means of a "cradle" or other such device.

Therefore, a mechanism whereby a mobile client for a server-side application may be enabled for multiple wireless devices with minimal modification of the application at the server is required. Further, the ability to install and upgrade the application onto mobile devices wirelessly without the need for human intervention or connection to PCs, is desirable.

BRIEF DESCRIPTION OF THE DRAWINGS

In figures that illustrate, by way of example, embodiments of the present disclosure:

FIG. 11 illustrates the format of messages exchanged in the message flow of FIG. 7;

FIG. 13 illustrates a sample portion of an application definition file defining the user interface illustrated in FIG. 12;

FIG. 14 illustrates the format of a message formed in accordance with the sample portion of the application definition file of FIG. 13;

FIG. 15A illustrates a sample portion of an application definition file defining a local storage at a mobile device;

FIG. 15B schematically illustrates local storage in accordance with FIG. 15A;

FIG. 15C illustrates how locally stored data is updated by a sample message in accordance with the sample portion of an application file definition of FIG. 15A;

DETAILED DESCRIPTION

Data from an application executing at a computing device may be presented at a remote wireless device. To assist this presentation, the remote wireless device may be provided with a document that describes aspects of the application to a further application executing on the remote wireless device. The document may, for instance, contain: definitions for a user interface format for the application at the wireless device; a format of network messages for exchange of data generated by the application; and a format for storing data related to the application at the wireless device. Using the definitions, the wireless device may receive data from the application and present an interface for the application. The document may be an Extensible Markup Language (XML) file. Similarly, application specific network messages provided to the device may also be formed using XML. In the preferred embodiment, the data from the application is presented at the mobile device by virtual machine software based on the format provided by the document.

Where a user of a remote wireless device requires interfaces to a number of applications, the user may register the device with a server. Upon receiving a registration request, the server may determine the identity of the user and, subsequently, identify applications associated with the user. The server may then generate a document specific to each identified application and transmit each document to the remote wireless device. Advantageously, the server may determine the type of the remote wireless device and generate the document specific to the type of remote wireless device.

In accordance with an aspect of the present disclosure, there is provided a method of configuring a mobile communication device. The method includes receiving a request for registration of a mobile communication device, determining an identity of a user associated with the mobile communication device, determining an identity of an application associated with the identity of the user, generating a document to describe aspects of the application to a further application executing on the mobile communication device and transmitting the document to the mobile communication device. In other aspects of the disclosure, a computing device is provided to carry out the method and a computer readable medium is provided to allow a processor to carry out the method.

Other aspects and features of the present disclosure will become apparent to those of ordinary skill in the art, upon review of the following description of specific embodiments of the application in conjunction with the accompanying figures.

Figure 1:
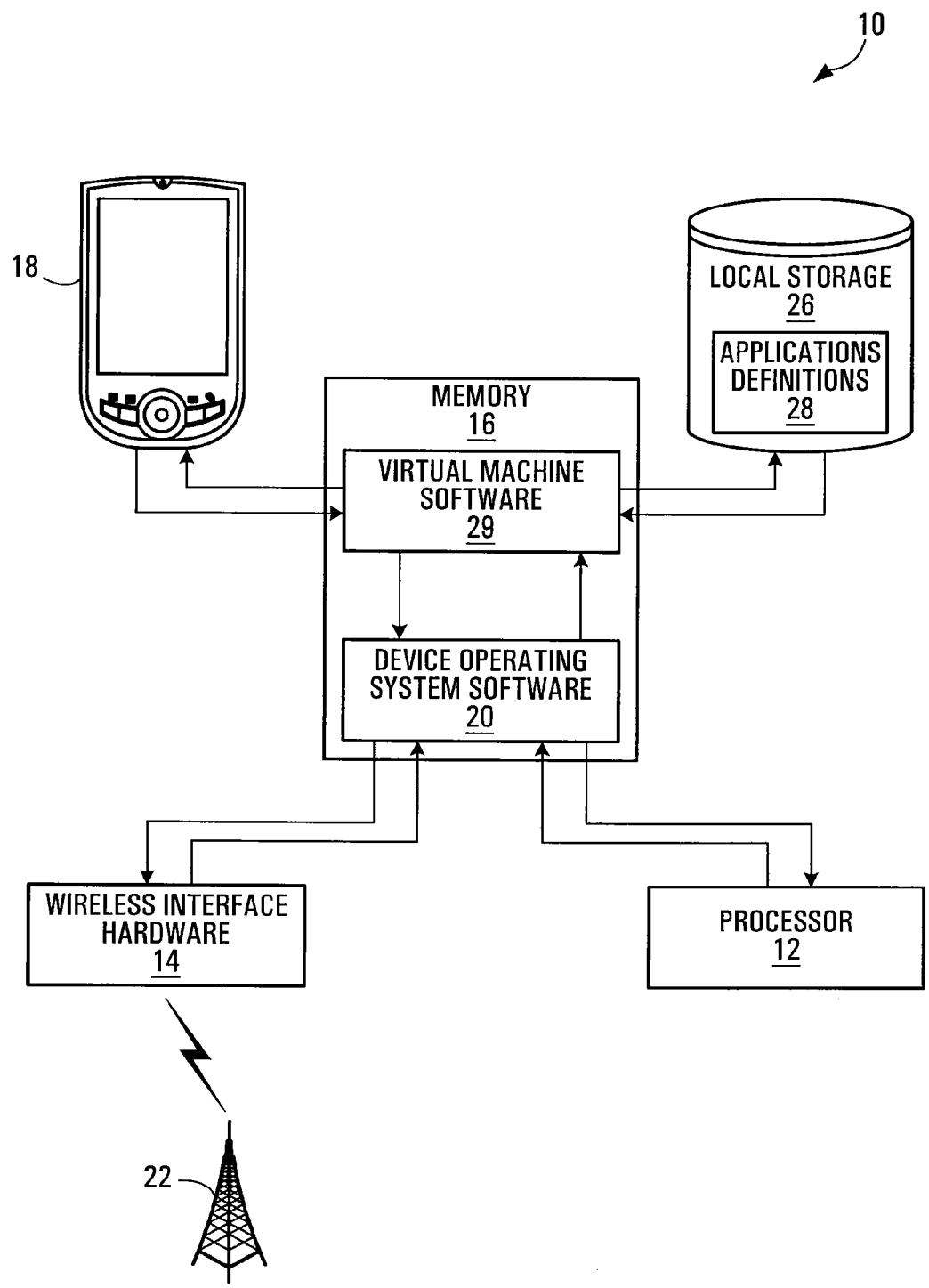
FIG. 1 schematically illustrates a mobile device, exemplary of an embodiment of the present application, including virtual machine software, further exemplary of an embodiment of the present application.

FIG. 1 illustrates elements of a mobile device 10, exemplary of an embodiment of the present application, in communication with a wireless network 22. The mobile device 10 may be any conventional mobile device, modified to function in manners exemplary of the present application. As such, elements of the mobile device 10 include a processor 12, a network interface 14, a storage memory 16 and a user interface 18 typically including a keypad and/or touch-screen. The network interface 14 enables the device 10 to transmit and receive data over the wireless network 22. The mobile device 10 may be, for example, be a WinCE based device, a PalmOS device, a WAP enabled mobile telephone, or the like. The storage memory 16 of the device 10 stores operating system software 20 providing a mobile operating system such as the PalmOS or WinCE. The operating system software 20 typically includes graphical user interface software and network interface software having suitable application programming interfaces (APIs) for use by other applications executing at the device 10.

The storage memory 16 at the device 10 further stores virtual machine software 29, exemplary of an embodiment of the present application. The virtual machine software 29, when executed by the mobile device 10, enables the device 10 to present an interface, for a server-side application provided by a middleware server, as described below. Specifically, a virtual machine 24 (see FIG. 2), which exists through an execution of the virtual machine software 29 on the processor 12, interprets a document that describes aspects of the server-side application to virtual machine executing on the device 10.

The document, which may be called an "application definition file", may define: a user interface 18 controlling application functionality and the display format (including display flow) at the device 10 for a particular server-side application; the format of data to be exchanged over the wireless network 22 for the particular server-side application; and the format of data to be stored locally at the device 10 for the particular server-side application. The virtual machine 24 uses the operating system software 20 and associated APIs to interact with the device 10, in accordance with the received application definition file. In this way, the device 10 may present interfaces for a variety of server-side applications, executed at a variety of servers. Moreover, multiple wireless devices may use a common server-side application, as each wireless device executes a similar virtual machine that interprets an application definition file to present a user interface and program flow specifically adapted for the device.

As such, and as will become apparent, the exemplary virtual machine software is specifically adapted to work with the particular mobile device 10. Thus, if the device 10 is a PalmOS or WinCE device, the virtual machine 24 that results from executing the exemplary virtual machine software 29 is, correspondingly, a PalmOS virtual machine or a WinCE virtual machine. As further illustrated in FIG. 1, the virtual machine 24 is capable of accessing the local storage 26 at the device 10.

Other applications, libraries and software may also be present within the memory 16 or the local storage 26 and are not specifically illustrated. For example, the device 10 may store and execute personal information management (PIM) software, including calendar and contact management applications. Similarly, the device 10 could store and execute software allowing the device 10 to perform a number of functions. Software could, for example, interact with the hardware at the device 10 to allow the device 10 to act as a multimedia player; allowing the device 10 to print; allowing the device 10 to interact with other incorporated hardware not specifically illustrated, including, but not limited to, a Bluetooth interface; a Global Positioning Satellite (GPS) Receiver; and the like. The memory 16 may also store software components in the form of object classes that may be used to extend the functionality of the virtual machine 24. As will become apparent, these external software components in the form of object classes allow the virtual machine 24 to become extensible. The object classes may, for example, allow the virtual machine 24 to access additional hardware or software local to the device 10.

As detailed below, an exemplary application definition file may be formed using a markup language, such as the known Extensible Markup Language (XML) or a variant thereof. In accordance with an embodiment of the present application, defined XML entities are understood by the virtual machine 24. Defined XML entities are detailed in Appendix "A" (FIGS. 16A-16JJ) of US Patent Application Publication 2003/0060896 A9. The defined XML entities are interpreted by the virtual machine 24 and may be used as building blocks to present an interface, at the mobile device 10, to server-side applications, as detailed herein.

Figure 2:
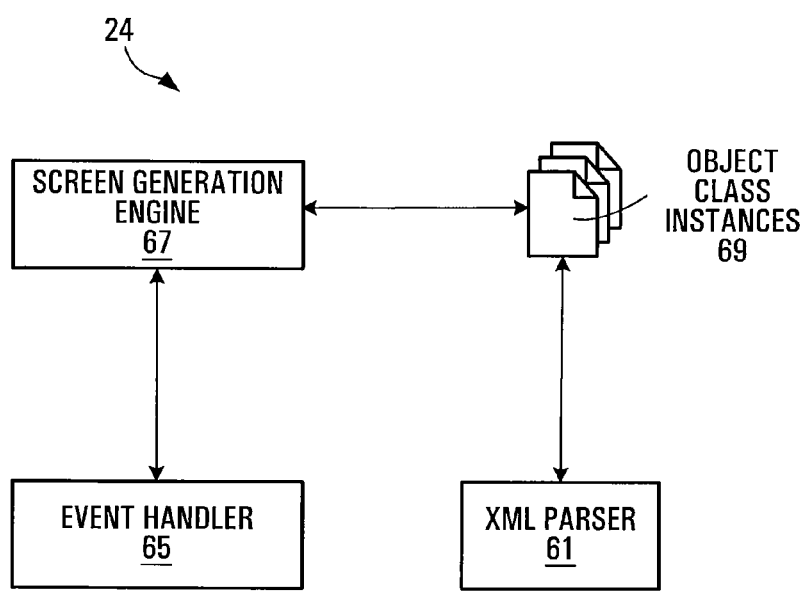
FIG. 2 further illustrates the organization of an exemplary virtual machine at the mobile device of FIG. 1.

Specifically, as illustrated in FIG. 2, the virtual machine software 29 includes: conventional XML parser software; event handler software; screen generation engine software; and object classes. The virtual machine software 29, when executed leads to the virtual machine 24, which includes: an XML parser 61; an event handler 65; a screen generation engine 67; and instances of the object classes 69. The object classes correspond to XML entities supported by the virtual machine software 29 and possibly other XML entities contained within an application definition file. Supported XML entities are detailed in Appendix "A" of previously referenced US Patent Application Publication 2003/0060896 A9. A person of ordinary skill will readily appreciate that those XML entities identified in Appendix "A" are exemplary only and may be extended or shortened as desired.

The XML parser 61 may be formed in accordance with the Document Object Model, or DOM, available at www.w3.org/DOM/, the contents of which are hereby incorporated by reference. The XML parser 61 enables the virtual machine 24 to read an application description file. Using the XML parser 61, the virtual machine 24 may form a binary representation of the application definition file for storage at the mobile device 10, thereby eliminating the need to parse text each time an application is used. The XML parser 61 may convert each XML tag contained in the application definition file, and its associated data, to tokens, for later processing. As will become apparent, this may avoid the need to repeatedly parse the text of an application description file.

The screen generation engine 67 orchestrates the display of initial and subsequent screens at the mobile device 10 in accordance with an application description file 28, as detailed below.

The event handler 65 allows the virtual machine 24 to react to certain external events. Example events include user interaction with presented screens or display elements, incoming messages received from a wireless network, or the like.

The object classes define objects that allow the mobile device 10 to process each of the supported XML entities.

Each of the object classes includes: attributes, which are used to store parameters defined by the XML file and functions allowing the XML entity to be processed at the mobile device, as detailed in Appendix "A" of previously referenced US Patent Application Publication 2003/0060896 A9, for each supported XML entity. So, as should be apparent, supported XML entities are extensible. The virtual machine software 29 may be expanded to support XML entities not detailed in Appendix "A". Corresponding object classes could be added to the virtual machine software 29.

As detailed below, upon invocation of a particular application at the mobile device 10, the virtual machine 24 presents an initial screen on the user interface 18 based on the contents of the application definition file 28. Screen elements are created by the screen generation engine 67 by creating instances 69 of corresponding object classes for defined elements. The object class instances 69 are created using attributes contained in the application definition file 28. Thereafter the event handler 65 of the virtual machine 24 reacts to events for the application. Again, the event handler 65 consults the contents of the application definition file 28 for the application in order to properly react to events. Events may be reacted to by instantiating associated "action" objects from the object classes.

Similarly, the object classes of the virtual machine software 29 further include object classes corresponding to data tables and network transactions defined in the Table Definition and Package Definition sections of Appendix "A" of previously referenced US Patent Application Publication 2003/0060896 A9. At run time, instances 69 of object classes corresponding to these classes are created and populated with parameters contained within the application definition file 28, as required.

Using this general description, persons of ordinary skill in the art will be able to form the virtual machine software 29 for any particular device. Typically, the virtual machine software 29 may be formed using conventional object oriented programming techniques and existing device libraries and APIs, as to function as detailed herein. As will be appreciated, the particular format of the screen generation engine 67 and the object class instances 69 will vary depending on the type of virtual machine software, the device operating system and the APIs available at the device. Once formed, a machine executable version of the virtual machine software 29 may be loaded and stored at the mobile device 10, using conventional techniques. The machine executable version of the virtual machine software can be embedded in ROM, loaded into RAM over a network or loaded into RAM from a computer readable medium. Although, in the described embodiment the virtual machine software is formed using object oriented structures, persons of ordinary skill will readily appreciate that other approaches could be used to form suitable virtual machine software. For example, the object classes forming part of the virtual machine software 29 could be replaced by equivalent functions, data structures or subroutines formed using a conventional (i.e., non-object oriented) programming environment. Operation of the virtual machine 24 while consulting an application definition file containing various XML definitions, is further detailed below.

Figure 3:
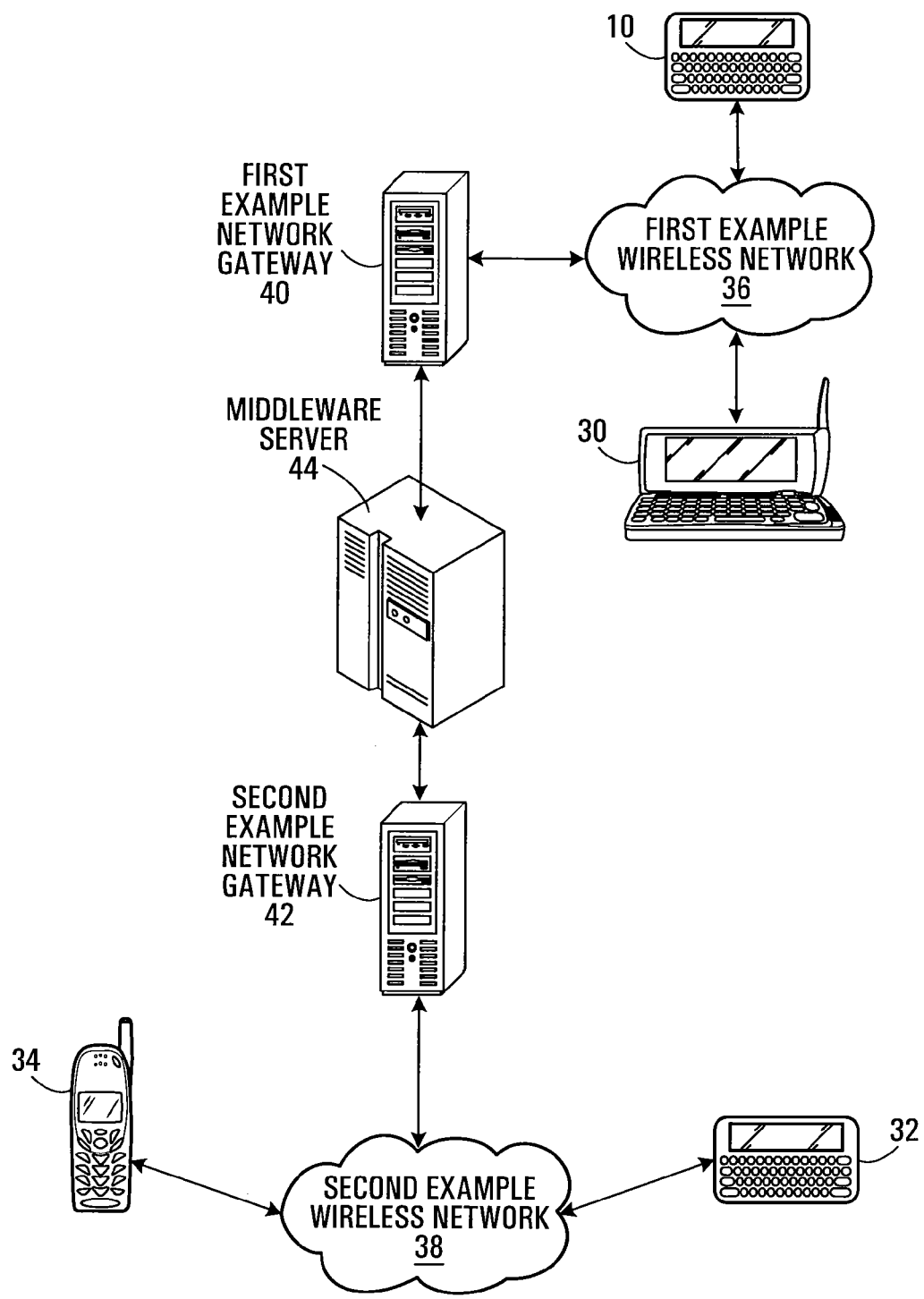
FIG. 3 illustrates an operating environment for the device of FIG. 1 including a middleware server.

FIG. 3 illustrates the operating environment for the first example mobile device 10. Further example mobile devices, including a second example mobile device 30, a third example mobile device 32 and a fourth example mobile device 34 are also illustrated in FIG. 3. These further example mobile devices 30, 32 and 34 are similar to the first example mobile device 10 and also store and execute virtual machine software exemplary of an embodiment of the present application.

Virtual machines, like the virtual machine 24 executed at the first example mobile device 10, execute on each of the further example mobile devices 30, 32, 34, and communicate with a middleware server 44 by way of a first example wireless network 36, a second example wireless network 38, a first example network gateway 40 and a second example network gateway 42. The example gateways 40, 42 are generally available as a service for those people wishing to have data access to wireless networks. An example network gateway is available from Broadbeam Corporation, of Cranbury, N.J., in association with the trademark SystemsGo!. The wireless networks 36, 38 are further connected to one or more computer data networks, such as the Internet and/or private data networks by way of the example gateways 40, 42. As will be appreciated, the application may work with many types of wireless networks. The middleware server 44 is, in turn, in communication with a data network that is in communication with the example wireless networks 36, 38. The communication protocol used for such communication may be HTTP over TCP/IP transport. As could be appreciated, other network protocols such as X.25 or SNA could equally be used for this purpose.

The mobile devices 10, 30, 32, 34 communicate with the middleware server 44 in two ways. First, the virtual machine at each device may query the middleware server 44 for a list of applications of which a user of an associated mobile device 10, 30, 32, 34 can make use. If a user decides to use a particular application, the corresponding mobile device 10, 30, 32, 34 can download a text description, in the form of an application definition file, for the particular application from the middleware server 44 over its wireless interface. As noted, the text description may be formatted using XML. Second, the virtual machine at each device may send, receive, present and locally store data related to the execution of applications, or its own internal operations. The format of exchanged data for each application is defined by an associated application description file. Again, the exchanged data may be formatted using XML in accordance with the application description file.

The middleware server 44, in turn, stores text application description files for those applications that have been enabled to work with the various mobile devices 10, 30, 32, 34 in a pre-defined format understood by the corresponding virtual machines. Software providing the functions of the middleware server 44 in the exemplary embodiment is written in Delphi and uses an SQL Server database.

As noted, text files defining application definitions and data may be formatted in XML. For example, XML version 1.0, detailed in the XML version 1.0 specification second edition, dated Oct. 6, 2000 and available at the internet address www.w3.org/TR/2000/REC-xml-2000-1006, the contents of which are hereby incorporated herein by reference, may be used. However, as will be appreciated by those of ordinary skill in the art, the functionality of storing XML description files is not dependent on the use of any given programming language or database system.

Each application definition file is formatted according to defined rules and uses pre-determined XML markup tags, known to both the virtual machine executed at the mobile device and the complementary server software executed at the middleware server 44. Tags define XML entities, which are used as building blocks to present an interface to an application at a mobile device. Knowledge of these rules, and an understanding of how each tag and section of text should be interpreted, allows the virtual machine executed at the mobile device to process an XML application definition file and thereafter provide an interface to an application executed at an application server, as described below. The virtual machine effectively acts as an interpreter for a given application definition file.

Figure 4:
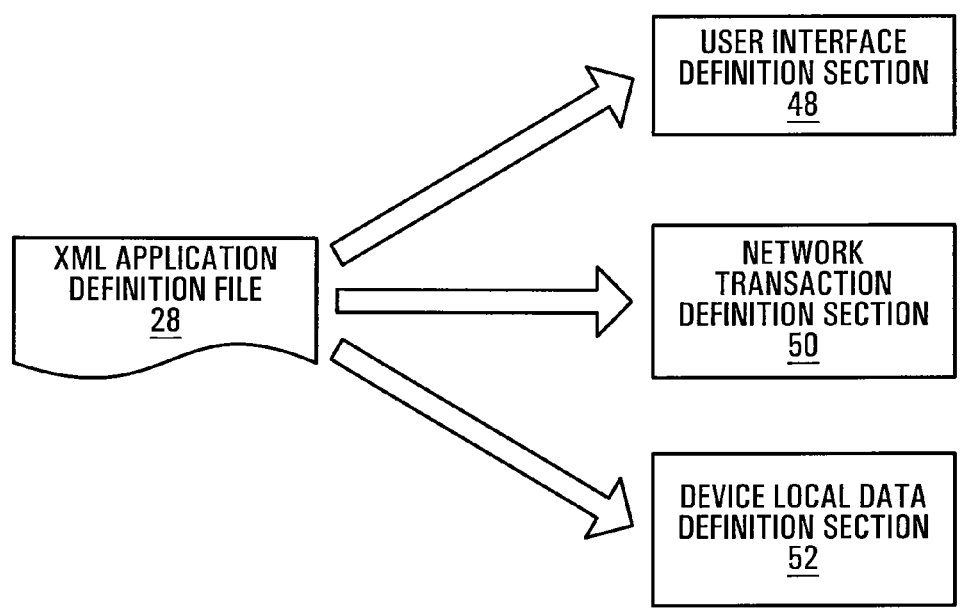
FIG. 4 illustrates the structure of an example application definition file stored at the middleware server of FIG. 3 used by the device of FIG. 1.

FIG. 4 illustrates an example format for an XML application definition file 28. As illustrated, the example application definition file 28 for a given mobile device and server-side application includes three components: a user interface definition section 48, specific to the user interface for the mobile device 10, that defines the format of screen or screens for the application and how the user interacts with the screens; a network transactions definition section 50 that defines the format of data to be exchanged with the application; and a local data definition section 52 that defines the format of data to be stored locally on the mobile device by the application.

Defined XML markup tags correspond to XML entities supported at a mobile device and are used to create an application definition file 28. The defined tags may broadly be classified into three categories, corresponding to the three sections 48, 50 and 52 of an application definition file 28.

Example XML tags and their corresponding significance are detailed in Appendix "A" of previously referenced US Patent Application Publication 2003/0060896 A9. As noted above, the virtual machine software 29 at the mobile device 10 includes object classes corresponding to each of the XML tags. At run time, instances of the classes are created as required.

Broadly, the following example XML tags may be used to define the user interface:

<SCREEN>—this tag defines a screen such that a SCREEN tag pair contains the definitions of the screen elements (buttons, radio buttons and the like) and the events associated with the screen and the screen control elements;

<BTN>—this tag defines a button and attributes associated with the button;

<LIST>—this tag defines a list box;

<CHOICEBOX>—this tag defines a choice item, which allows selection of a value from predefined list;

<MENU>—the application developer will use this tag to define a menu for a given screen;

<EDITBOX>—this tag defines an edit box;

<TEXT ITEM>—this tag describes a text label that is to be displayed;

<CHECKBOX>—this tag describes a checkbox;

<HELP>—this tag defines a help topic that is used by another element on the screen;

<IMAGE>—this tag describes an image that appears on those displays that support images;

<ICON>—this tag describes an icon;

<EVENT>—this tag defines an event to be processed by the virtual machine 24 (events can be defined against the application as a whole, individual screens or individual items on a given screen; sample events include: receipt of data over the wireless interface; and an edit of text in an edit box); and <ACTION>—this tag defines a particular action that might be associated with an event handler (sample actions include: navigating to a new window; and displaying a message box.).

The second category of example XML tags may be used in the network transaction section 50 of the application definition file 28. These may include the following example XML tags:

<TABLEUPDATE>—using this tag, the application developer can define an update that is performed to a table in the device-based local storage 26 (attributes of this tag allow the update to be performed against multiple rows in a given table at once); and <PACKAGEFIELD>—this tag defines a field in an XML package that passes over the wireless interface.

The third category of XML tags are those used to define a logical database that may be stored in local storage 26 at the mobile device 10. The tags available that may be used in this section are:

<TABLE>—this tag, along with its attributes, defines a table (contained within a pair of <TABLE> tags are definitions of the fields contained in that table; the attributes of a table control such standard relational database functions as the primary key for the table); and <FIELD>—this tag defines a field and its attributes (attributes of a field are those found in a standard relational database system, such as the data type, whether the field relates to a field in a different table, the need to index the field and so on).

The virtual machine 24 may, from time to time, need to perform certain administrative functions on behalf of a user. In order to do this, one of the object classes is associated with a repertoire of tags to communicate needs to the middleware server 44. Such tags differ from the previous three groupings in that they do not form part of an application definition file, but are solely used for administrative communications between the virtual machine 24 and the middleware server 44. XML packages using these tags are composed and sent due to user interactions with configuration screens of the virtual machine 24. The tags used for this include:

<REG>—this tag allows the application to register and deregister a user for use with the middleware server 44;

<FINDAPPS>—by using this tag, users can interrogate the middleware server 44 for a list of available applications;

<APPREG>—using this tag, a mobile device can register (or deregister) for an application and have the application definition file downloaded automatically (or remove the application definition file from the device-based local storage 26); and <SETACTIVE>—using this tag, the user is allowed to identify the device that the user is currently using as the active device (if the user's preferred device is malfunctioning, or out of power or coverage, the user may need a mechanism to tell the middleware server 44 to attempt delivery to a different device).

Figure 5:
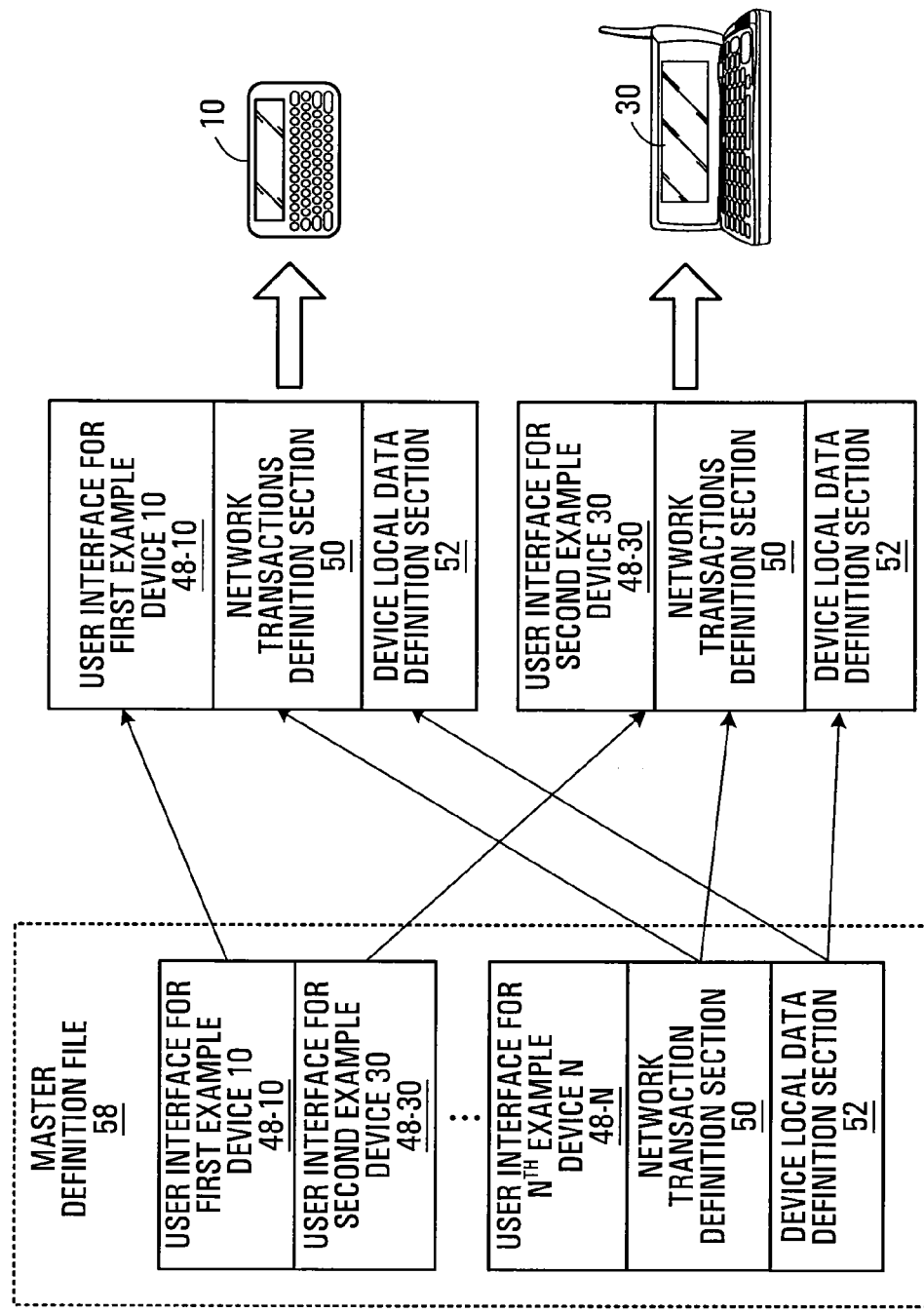
FIG. 5 schematically illustrates the formation of application definition files at the middleware server of FIG. 3.

FIG. 5 illustrates the organization of application definition files at the middleware server 44 and how the middleware server 44 may generate an application definition file 28 (FIG. 4) for a given one of the example mobile devices 10, 30, 32, 34. In the illustration of FIG. 5, only the first example mobile device 10 and the second example mobile device 30 are considered. Typically, since network transactions and local data are the same across devices, the only portion of the application definition file that varies for different devices is the user interface definition section 48.

As such, the middleware server 44 stores a master definition file 58 for a given server-side application. This master definition file 58 contains: an example user interface definition section 48-10 for the first example mobile device 10 of FIG. 1; an example user interface definition section 48-30 for the mobile device 30 of FIG. 3; a user interface definition section 48-N for an Nth mobile device; a description of the network transactions that are possible in the network transactions definition section 50; and a definition of the data to be stored locally on the mobile device in the local data definition sections 52. Preferably, the network transactions definition section 50 and the local data definition sections 52 will be the same for all example mobile devices 10, 30, ..., N.

For the first example mobile device 10, the middleware server 44 composes the application definition file 28 by determining the device type and adding the user interface definition section 48-10 for the first example mobile device 10 to the definition sections 50, 52 for the network transactions and the device local data. For the second example mobile device 30, the middleware server 44 composes the application definition file by adding the user interface definition section 48-30 for the second example mobile device 30 to the definition sections 50, 52 for the network transactions and the device local data.

The master definition file 58 for a given application is likely to be created away from the middleware server 44 and loaded onto the middleware server 44 by administrative staff charged with the operation of the middleware server 44. Master definition files could be created either by use of a simple text editor or by a graphical file generation tool. Such a tool might generate part or all of the file, using knowledge of the XML formatting rules, based on the user's interaction with screen painters, graphical data definition tools and the like.

Figure 6:
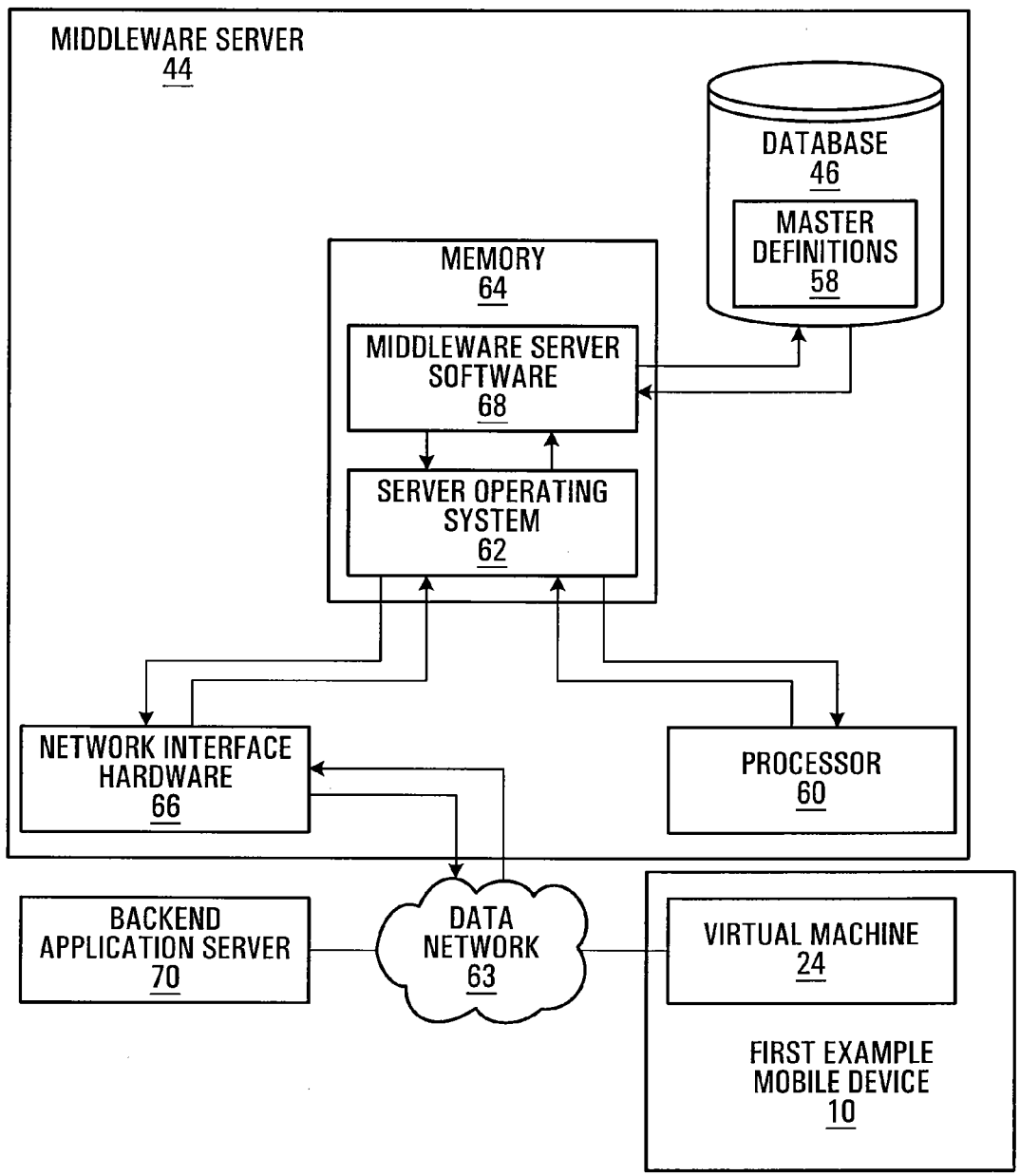
FIG. 6 schematically illustrates the middleware server of FIG. 3, exemplary of an embodiment of the present application, including a database, further exemplary of an embodiment of the present application.

FIG. 6 illustrates the organization of middleware server 44 and associated master definition files. The middleware server 44 may be any conventional application server modified to function in manners exemplary of the present application. As such, the middleware server 44 includes a processor 60, a network interface 66, a storage memory 64 and a server database 46. The middleware server 44 may, for example, be a Windows NT server, a Sun Solaris server, or the like. Correspondingly, the storage memory 64 of the middleware server 44 stores a server operating system 62 such as Windows NT or Solaris.

The network interface hardware 66 enables the middleware server 44 to transmit and receive data over a data network 63. Transmissions are used to communicate with both the virtual machine 24 of the first example mobile device 10, via the wireless networks 36, 38 and the wireless gateways 40, 42, and a backend application server 70, which may be considered representative of one or more application servers. The backend application server 70 may be considered both the end recipient of data received by the middleware server 44 from the mobile devices and the generator of data that is to be sent by the middleware server 44 to the mobile devices.

The storage memory 64 at the middleware server 44 further stores middleware server software 68, exemplary of an embodiment of an aspect of the present application. The middleware server software 68, when executed by the processor 60 of the middleware server 44, enables the middleware server 44 to compose and understand XML packages that are sent by and received by the middleware server 44. These XML packages may be exchanged between the middleware server 44 and the first example mobile device 10 or between the middleware server 44 and the backend application server 70.

As mentioned above, communication between the backend application server 70 and the middleware server 44 may use HTTP running on top of a standard TCP/IP stack. An HTTP connection between a running application at the backend application server 70 and the middleware server 44 may be established in response to receipt of an XML package from a mobile device. The server-side application executed at the backend application server 70 provides output to the middleware server 44 over this connection. The server-side application output may be formatted, by the server-side application, into appropriate XML packages understood by the virtual machine 24 at the first example mobile device 10.

That is, a given server-side application (or an interface portion of the server-side application) formats server-side application output into an XML package in a manner consistent with a format defined in the application definition file for the given server-side application. Alternatively, an interface component, separate from the server-side application, could easily be formed with an understanding of the format for output for the given server-side application. That is, with a knowledge of the format of data provided by and expected by the given server-side application at the backend application server 70, an interface component could be a produced using techniques readily understood by those of ordinary skill. The interface component could translate the output of the given server-side application to an XML package, as expected by the middleware server 44. Similarly, the interface portion may translate an XML package received, via the middleware server 44, from the mobile device 10 into a format understood by the given server-side application.

The particular identity of the mobile device on which the interface to the server-side application is to be presented may be specified by a suitable identifier, contained in a header prefixed to the server-side application output XML package. This header may be used by the middleware server 44 to determine the appropriate mobile device to which to forward the XML package. Alternatively, the identity of the connection between the backend application server 70 and the middleware server 44 could be used to determine, at the middleware server 44, the appropriate mobile device to which to forward the XML package.

Figure 7:
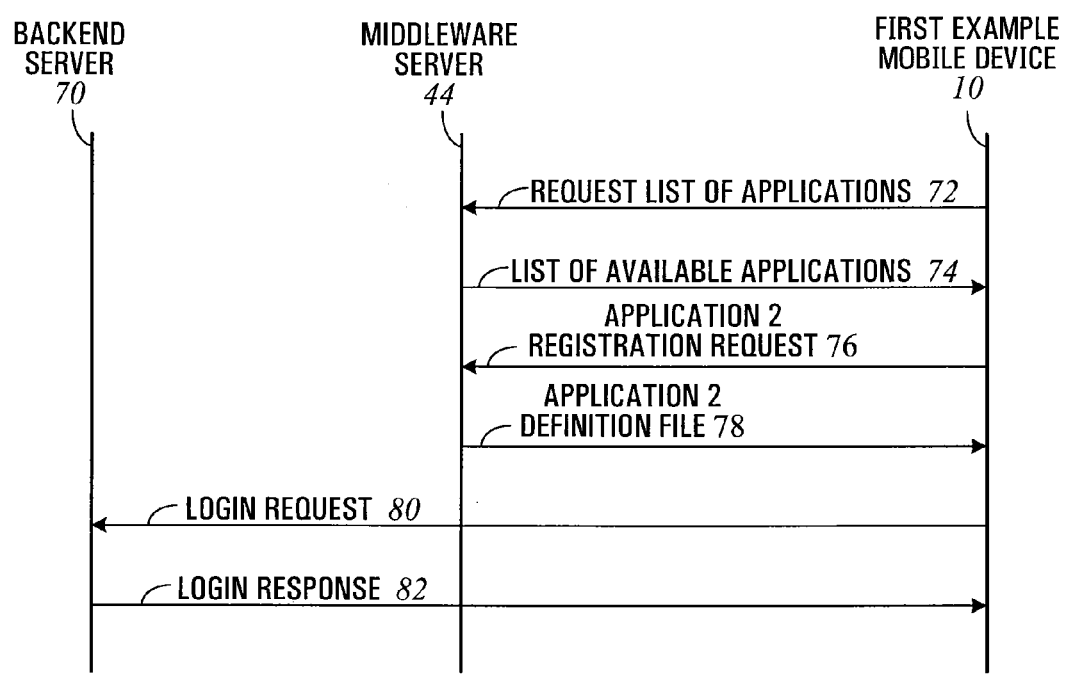
FIG. 7 is a sequence diagram illustrating the exchange of sample messages passed between the mobile device, the middleware server and the backend application server of FIG. 3.

FIG. 7 illustrates a flow diagram detailing data flow (application data or application definition files 28) between the mobile device 10 and the middleware server 44, in manners exemplary of an embodiment of the present application.

For data requested from the middleware server 44, the device 10, under software control by the virtual machine software, transmits requests to the middleware server 44 (see also FIG. 3), which requests pass over the first wireless network 36 to the first network gateway 40. The first network gateway 40 passes the request to the middleware server 44. The processor 60 of the middleware server 44 responds by executing a database query on the server database 46. The response to the query is an indication of the applications that are available to the user and the mobile device 10. Data representative of the indication is passed, by the middleware server 44, to the first network gateway 40. The first network gateway 40 forwards the data representative of the indication to the mobile device 10 over the first wireless network 36.

FIG. 7, when considered with FIG. 3, illustrates a sequence of communications, between the virtual machine 24 at the device 10 and the middleware server 44, that may occur when the user of the mobile device 10 wishes interact with a server-side application. Accordingly, initially, the virtual machine 24 interrogates the middleware server 44 to determine the applications that are available for the first example mobile device 10. This interrogation may be initiated by the user instructing the virtual machine 24 at the first example device 10 to interrogate the middleware server 44. Responsive to these instructions, the virtual machine 24 composes an XML package requesting the list of applications. The wireless interface hardware 14 (see FIG. 1) of the mobile device 10 transmits the XML package to the middleware server 44 (data flow 72). The XML message may be composed to contain a <FINDAPPS> tag, signifying, to the middleware server 44, a desire for a list of available applications. In response, the middleware server 44 makes a query to the server database 46. The server database 46, responsive to this query, returns a list of applications that are available to the user and to the first example mobile device 10. The list is typically based, at least in part, on the type of mobile device making the request, the identity of the user of the mobile device and the applications known to the middleware server 44. The middleware server 44 converts the list into an XML list package and transmits the XML list package, including a list of available applications, to the mobile device 10 (data flow 74). Again, a suitable XML tag identifies the XML list package as containing a list of available applications.

In response to being presented with the list of available applications, a user at the first example device 10 may choose to register for an available server-side application in the list. When the user chooses to register for an application, the virtual machine 24 at the device 10 composes a registration request XML package containing a registration request for the selected application. The wireless interface hardware 14 transmits the registration request XML package to the middleware server 44 (data flow 76). The registration request XML package may contain a <REG> tag. The name of the application is specified in the registration request XML package. The middleware server 44, in response to receiving the registration request XML package, queries the server database 46 for a user interface definition associated with the specified application and the first example mobile device 10. Thereafter, the middleware server 44 creates the application definition file, as detailed with reference to FIG. 5. Then, the middleware server 44 composes an XML package including the composed application definition file and transmits the XML package to the mobile device 10 (data flow 78).

The user is then able to use the functionality defined by the application definition file to send and receive data.

After receiving the XML package including the application definition file, the XML parser 61 of the virtual machine 24 may parse the XML text of the application definition file to form a tokenized version of the application definition file. That is, each XML tag of the application definition file may be converted to a defined token for compact storage and to minimize repeated parsing of the XML text file. The tokenized version of the application definition file may then be stored for immediate or later use by the device 10.

Thereafter, upon invocation of an interface to the particular application for which the device 10 has registered, the screen generation engine 67 of the virtual machine 24 locates the definition of an initial screen for the particular application. The initial screen may be identified within the application definition file for the particular application as corresponding to a <SCREEN> tag with an associated attribute of First screen="yes".

Figure 8:
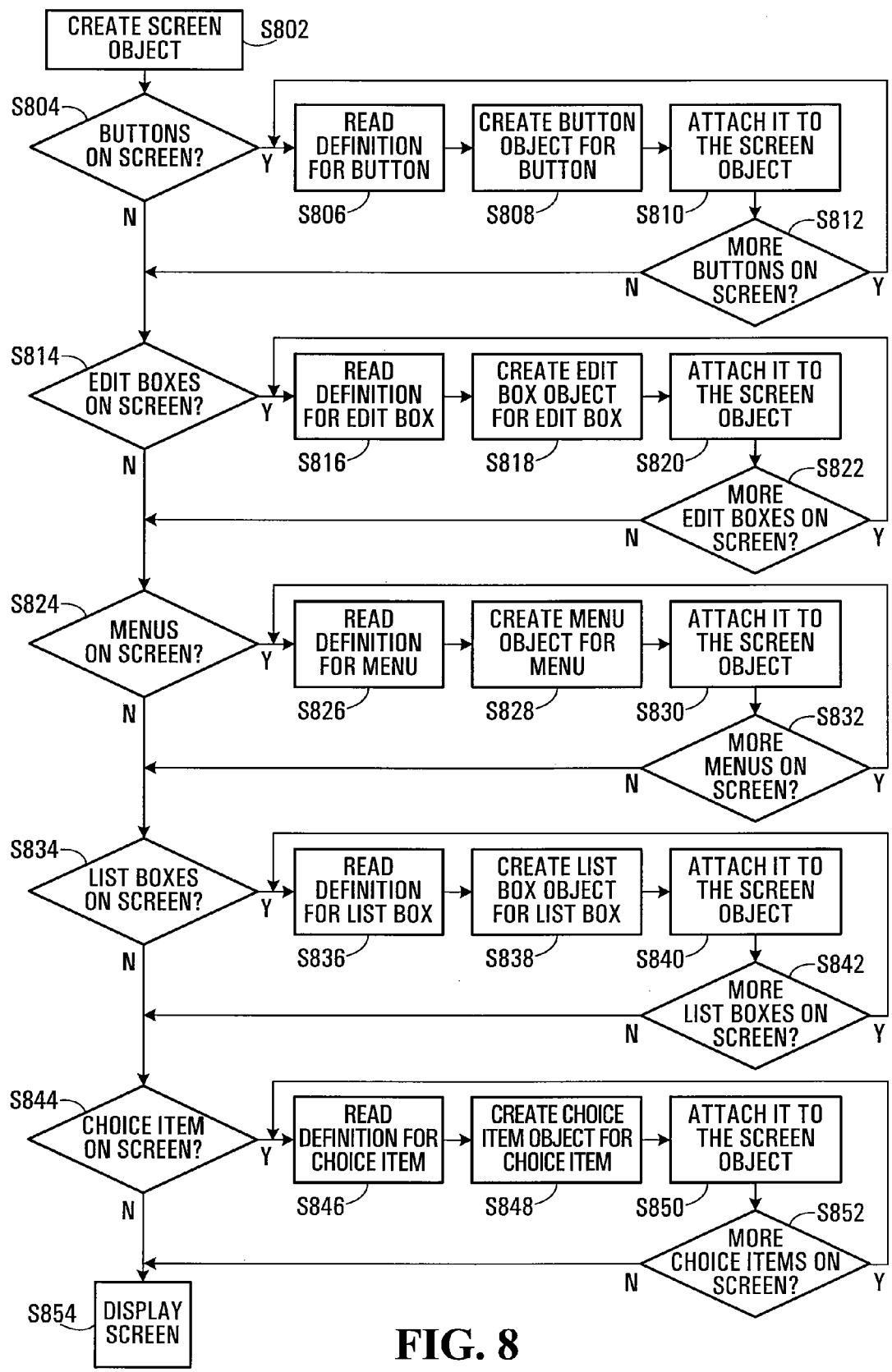
FIG. 8 illustrates steps performed at a mobile device under control of the virtual machine of FIG. 2.

Exemplary steps performed by the virtual machine 24 in processing the initial screen (and any screen) are illustrated in FIG. 8. As illustrated, the screen generation engine 67 generates an instance of an object class, defining a screen by parsing the section of the application definition file corresponding to the <SCREEN> tag in step S802. Supported screen elements may be buttons, edit boxes, menus, list boxes and choice items, as identified in sections 5.3, 5.4 and 5.5 of Appendix "A" of previously referenced US Patent Application Publication 2003/0060896 A9. Other screen elements, such as images and checkboxes, as detailed in Appendix "A", may also be supported. However, for clarity of illustration, the processing of the other screen elements by the screen generation engine 67 is not detailed. Each supported tag under the SCREEN definition section, in turn, causes creation of instances 69 of object classes within the virtual machine 24. Typically, instances of object classes corresponding to the tags, used for creation of a screen, result in presentation of data at the mobile device 10. As well, the creation of such instances may give rise to events (e.g., user interaction) and actions to be processed at the device 10.

Figure 9:
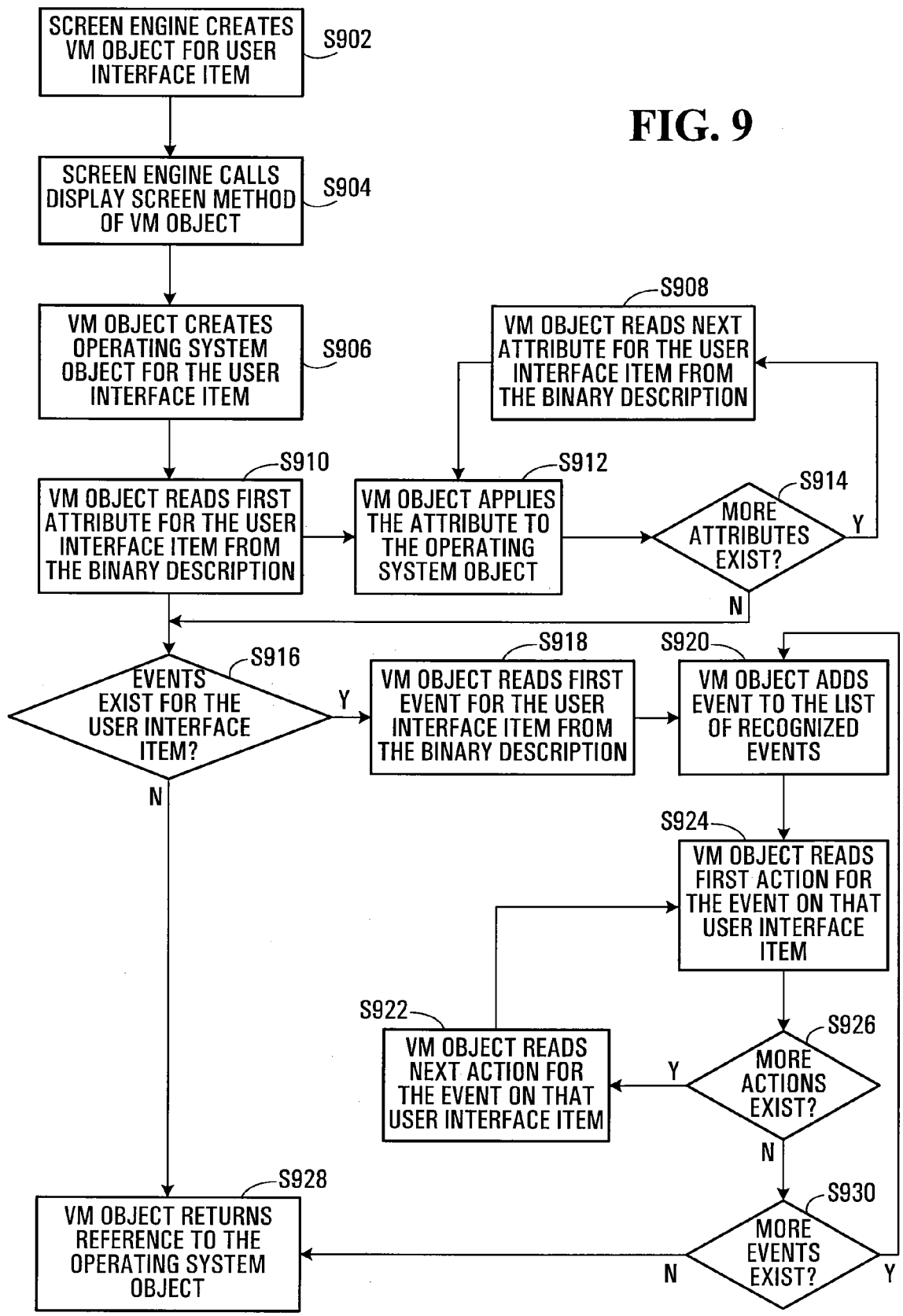
FIG. 9 illustrates steps performed at a mobile device under control of the virtual machine of FIG. 2.

Each element definition causes the virtual machine 24 to use the operating system of the mobile device 10 to create a corresponding display element of a graphical user interface as more particularly illustrated in FIG. 9. Specifically, for each element, the associated XML definition is read in step S806, S816, S826, S836, and S846, and a corresponding instance of a screen object class defined as part of the virtual machine software is created by the virtual machine 24 in steps S808, S818, S828, S838 and S848, in accordance with steps S902 and onward illustrated in FIG. 9. Each interface object is instantiated in step S902. Each object takes as attribute values defined by the XML text associated with the element. A method of the object is further called in step S904 and causes a corresponding device operating system object to be created. Those attributes defined in the XML text file, and stored within the virtual machine object instance, are applied to the corresponding display object created using the device operating system in steps S908S-S914. These steps are repeated for all attributes of the virtual machine object. For any element allowing user interaction, giving rise to an operating system event, the event handler 65 of the virtual machine 24 is registered to process operating system events, as detailed below.

Additionally, for each event (as identified by an <EVENT> tag) and action (as identified by an <ACTION> tag) associated with each XML element, the virtual machine 24 instantiates a corresponding event object and action object forming part of the virtual machine software. The virtual machine 24 further maintains a list identifying each event object and each action object, and an associated identifier of an event in steps S916 to S928.

Steps S902-S930 are repeated for each element of the screen in steps S808, S818, S828, S838 and S848 as illustrated in FIG. 8. All elements between the <SCREEN> definition tags are so processed. After the entire screen has been so created in memory, it is displayed in step S854, using conventional techniques.

As will be appreciated, objects are specific to the type of device executing the virtual machine software. Functions initiated as a result of the XML description may require event handling. This event handling is processed by the event handler 65 of the virtual machine 24 in accordance with the application definition file 28. Similarly, receipt of data from a mobile network will give rise to events. The event handler 65, associated with a particular application presented at the device, similarly processes incoming messages for that particular application. In response to the events, the virtual machine 24 instantiates software objects and calls functions of those objects, as required by the definitions contained within the XML definitions contained within the application definition file 28, giving rise to the event.

As noted, the virtual machine software 29 includes object classes, allowing the virtual machine 24 to instantiate objects corresponding to an <EVENT> tag. The event object classes include methods specific to the mobile device that allow the device to process each of the defined XML descriptions contained within the application definition file and also allow the device to process program/event flow resulting from the processing of each XML description.

Figure 10:
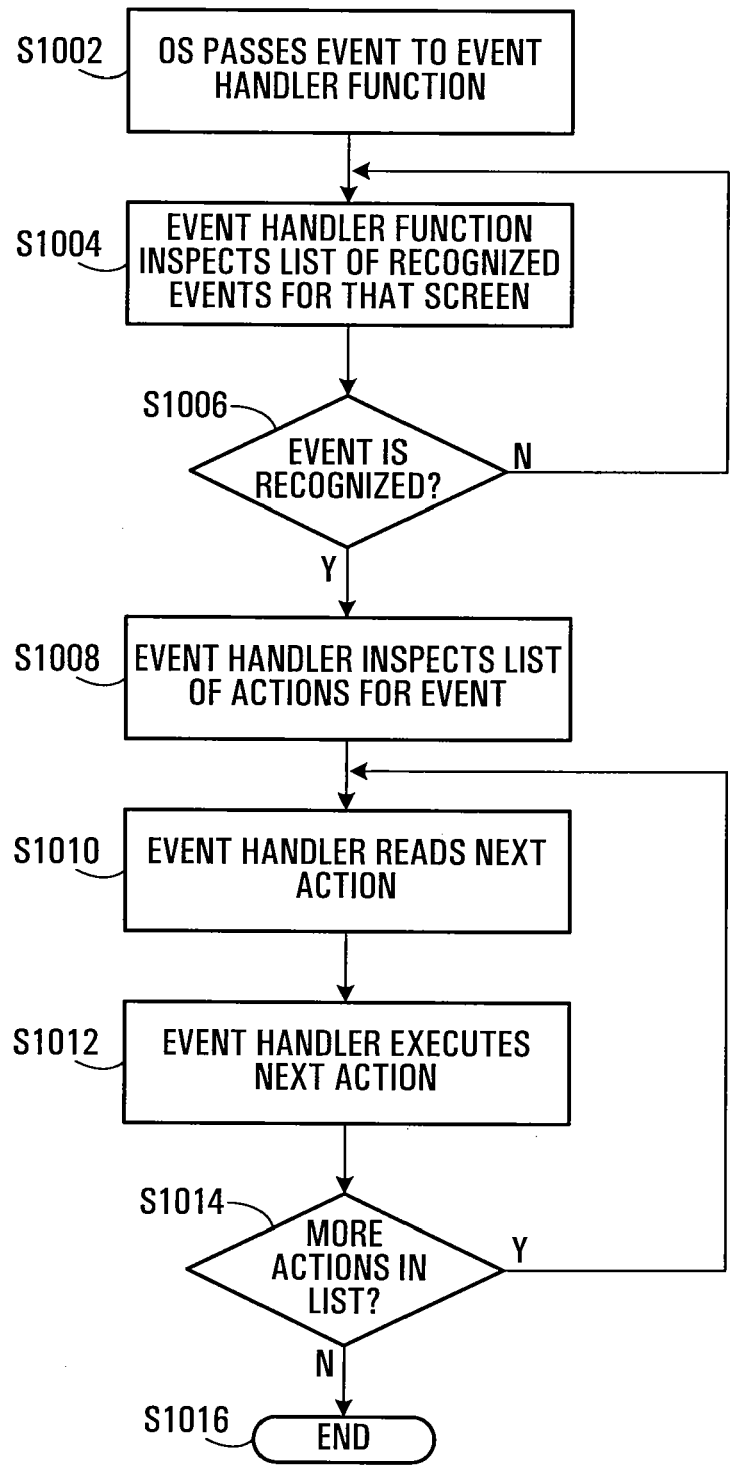
FIG. 10 illustrates steps performed at a mobile device under control of the virtual machine of FIG. 2.

Events may be handled by the virtual machine 24 as illustrated in FIG. 10. Specifically, as the event handler 65 has been registered with the operating system for created objects, upon occurrence of an event, steps S1002 and onward are performed in response to the operating system detecting an event.

An identifier of the event is passed to the event handler 65 in step S1002. In steps S1004-S1008, this identifier is compared to the known list of events, created as a result of steps S916-S930. For an identified event, actions associated with that event are processed in step S1008-S1014. That is, the virtual machine 24 performs the action defined in the <ACTION> tag associated with the <EVENT> tag corresponding to the event giving rise to processing by the event handler 65. The <ACTION> may cause creation of a new screen, as defined by a screen tag, a network transmission, a local storage, or the like.

New screens, in turn, are created by invocation of the screen generation engine 67, as detailed in FIGS. 8 and 9. In this manner, the navigation through the screens of the application is accomplished according to the definition embodied in the application definition file.

Similarly, when the user wishes to communicate with the middleware server 44, or store data locally, the event handler 65 creates instances 69 of corresponding object classes of the virtual machine software 29 and calls methods of the instances to transmit the data, or store the data locally, using the local device operating system. The format of the data stored locally is defined by the local data definition section 52; the format of XML packages transmitted or received is defined in the network transaction package definition section 50.

For example, data that is to be sent to the wireless network is assembled into XML packages using methods of an XML builder object. Methods defined in as part of the XML builder object allow creation of a full XML package before passing the completed XML package to a message server object. The message server object uses the device's network APIs to transmit the completed XML package across the wireless network.

XML packages received from the data network 63 (FIG. 6) give rise to events processed by the event handler 65. Processing of the receipt of XML packages is not specifically illustrated in FIG. 9. However, the receipt of a XML package triggers a "data" event recognized by the device operating system 20 (see FIG. 1). This data event is passed to the virtual machine 24 and the event handler 65 inspects the received XML package. As long as the data received is a valid XML data package as contained within the application definition file, the virtual machine 24 inspects the list of recognized XML entities.

So, for example, a user could trigger the transmission of a login request (data flow 80, FIG. 7) by interacting with an initial login screen, defined in the application definition file for the application. The login request (data flow 80) would be passed by the middleware server 44 to the backend application server 70. The backend application server 70, according to the logic embedded within its application, would return a login response (data flow 82), which the middleware server 44 would pass to the virtual machine 24. Other applications, running on the same or other application servers might involve different interactions, the nature of such interactions being solely dependent on the functionality and logic embedded within the backend application server 70 and remaining independent of the middleware server 44.

FIG. 11 illustrates example XML messages passed as part of the message flows illustrated in FIG. 7. For each message, the header portion, i.e., the portion enveloped by the <HEAD></HEAD> tag pair, is considered to contain a timestamp and an identifier of the sending device.

A first example message 72 is representative of a message sent by the mobile device 10 to request the list of applications that the middleware server 44 has available to that user on that device. The first example message 72 specifies a type for the mobile device 10 using text contained by the <PLATFORM></PLATFORM> tag pair. A second example message 74 is representative of a message sent, to the mobile device 10 by the middleware server 44, in response to the first example message 72. The second example message 74 contains a set of <APP></APP> tag pairs, each tag pair enveloping an identity of a single application that is available to the user at the device 10. A third example message 76 is representative of a message sent from the mobile device 10 to the middleware server 44 to request registration for a single server-side application. The tags specify information about the user and the mobile device 10. A fourth example message 78 is representative of a message sent, to the mobile device 10 by the middleware server 44, in response to the third example (registration request) message 76. The <VALUE></VALUE> tag pair envelope a code indicating success or failure. In the fourth example message 78 shown, a success is indicated by "CONFIRM" and is followed by an interface description for the application, enveloped by the <INTERFACE></INTERFACE> tag pair. This interface description may then be stored locally within the storage memory 16 of the mobile device 10.

As noted, when a user starts an interface to an application, an application definition file for which has been downloaded in the manner described above, the virtual machine 24 reads the interface description section of the application definition file. The virtual machine 24 identifies the screen that should be displayed on startup and displays the elements of the screen as detailed in relation to FIGS. 9 and 10. The user may then use the functionality defined by the application definition file to send XML packages to, and receive XML packages from, the associated backend application server via the middleware server 44.

Figure 12:
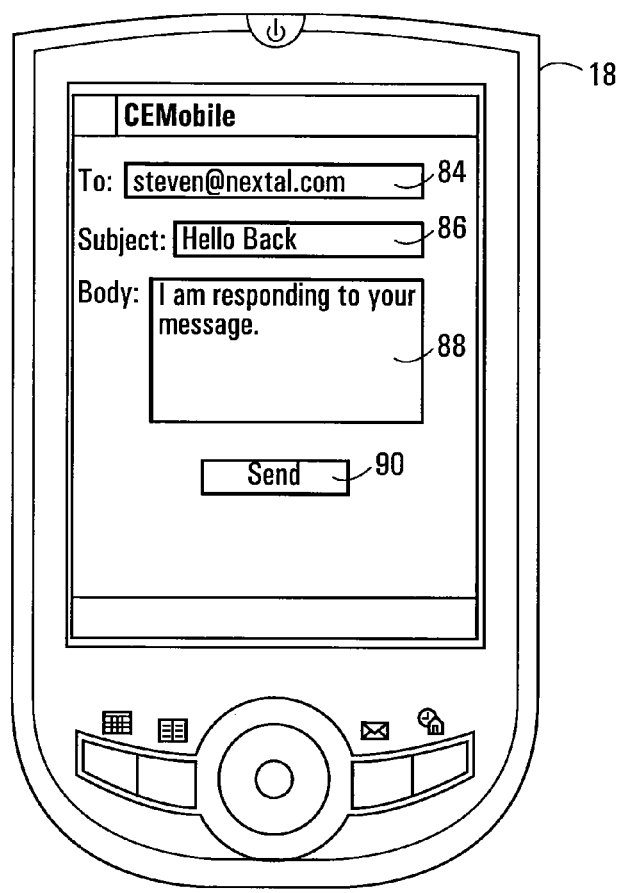
FIG. 12 illustrates a presentation of a user interface for a sample application at a mobile device.
Figure 16:
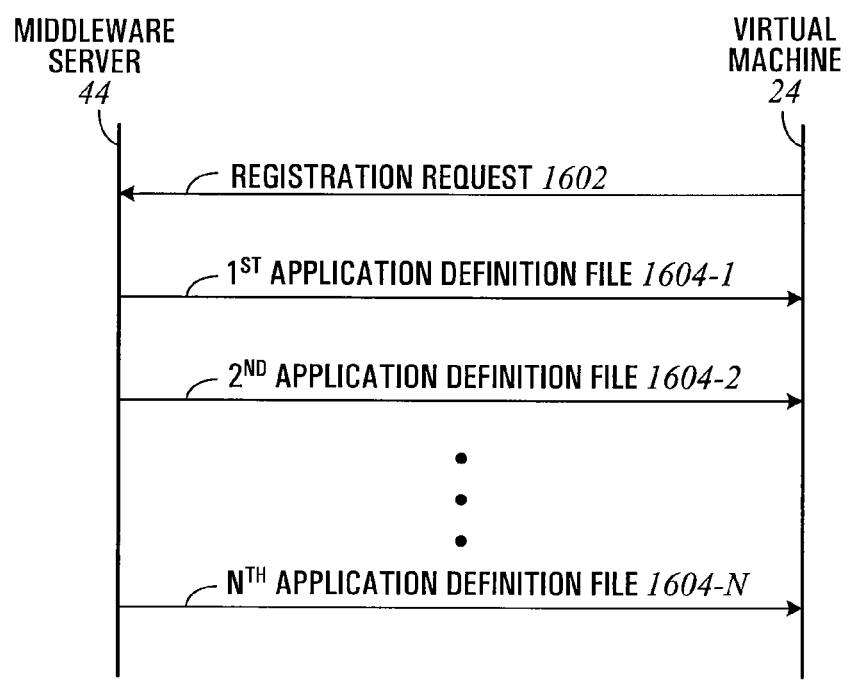
FIG. 16 is a sequence diagram illustrating the exchange of messages between the mobile device and the middleware server.

For the purposes of illustration, FIGS. 12 and 13 illustrate the presentation of a user interface for a sample screen on a Windows CE Portable Digital Assistant. As illustrated in FIG. 13, a first XML portion 92 of the application definition file 28 is an interface description for a screen with the name "NewMsg". This interface description may be contained within the user interface definition section 48 of the application definition file 28 associated with the server-side application. The screen is defined to have a single button identified by a <BTN> tag, which is identified as item D in FIG. 13, with attributes NAME="OK", CAPTION="Send", INDEX="0", X="0", Y="15", HT="18" and WT="50". This button gives rise to a single event (identified by the <EVENTS> tag) that has two associated actions: one defined by the <ACTION> tag with attribute TYPE="SAVE"; and one defined by the <ACTION> tag with attribute TYPE="ARML". The latter action results in the generation of an XML package (defined by the <PKG> tag with attribute TYPE="ME"), which has a data format as defined enveloped by the <PKG></PKG> tag pair. The package is defined to begin with a <MAIL> TAG with attributes MSGID, FROM and SUBJECT. Additionally, the interface description for the screen includes definitions for three edit boxes, as enveloped by the <EDITBOXES></EDITBOXES> tag pair. The definitions for the three edit boxes are identified in FIG. 13 as lines of XML code labeled A, B and C.

Upon invocation of the interface to the server-side application at the mobile device 10, the screen generation engine 67 of the virtual machine 24 processes the interface definition for the screen, as detailed with reference to FIGS. 8 and 9. That is, for XML tag D, the screen generation engine 67 creates a button object in accordance with steps S804-S812. Similarly for XML tag pairs A, B and C within the application definition file 28, the virtual machine 24 instantiates edit box objects (i.e., steps S834-S842, see FIGS. 8 and 9). The data contained within the object reflects the attributes of the relevant button and edit box tags, contained in the application definition file 28 associated with the server-side application.

The resulting screen presented by the user interface 18 of the mobile device 10 is illustrated in FIG. 12. The user interface 18 depicts a screen called "NewMsg", which uses interface items that provide a user with an ability to compose and send data. The screen illustrated in FIG. 12 has an edit box named "To" 84 corresponding to XML tag pair A in FIG. 13, an edit box named "Subject" 86 corresponding to XML tag pair B in FIG. 13 and an edit box named "Body" 88 corresponding to XML tag pair C in FIG. 13. The screen illustrated in FIG. 12 also incorporates a button named "OK" 90 corresponding to XML tag D in FIG. 13.

Call-backs associated with the OK button 90 cause graphical user interface application software, as part of the operating system at the mobile device 10, to return control to the event handler 65 of the virtual machine 24. Thus, as the user interacts with the user interface 18, the user may input data within the presented screen using the mobile device API. Once data is to be exchanged with the middleware server 44, the user may press the OK button 90 and, by doing so, invoke an event, which is initially handled by the operating system of the mobile device 10. However, during the creation of the OK button 90, in steps S804-S810, any call-back associated with the button was registered to be handled by the event handler 65 of the virtual machine 24. Upon completion, the virtual machine 24 receives data corresponding to the user's interaction with the user interface 18 and packages this data into an XML package using corresponding objects. The XML package is populated according to the rules within the application definition file 28.

The event handler 65, in turn, processes the event caused by user interaction with the OK button 90 in accordance with the <EVENT> tag and corresponding <ACTION> tag associated with the <BTN> tag, referenced as XML tag D, associated with the OK button 90. The events, and associated actions, are listed as data items associated with the relevant user interface item within the application definition file 28. The <ACTION> tag causes the virtual machine 24 to instantiate an object that forms an XML package for transmission to the middleware server 44 in accordance with the format defined within the <ACTION></ACTION> tag pair. That is, a "template" (defined beginning with the <PKG> tag with attribute TYPE="ME") for the XML package to be sent is defined within the <EVENT></EVENT> tag pair for a given user interface item. This template specifies the format of the XML package to be sent and may include certain variable fields. The variable fields in the formatted XML package take on contents that vary according to the values received in data entry fields on the current and previous screens. The definition of the template specifies which data entry field should be interrogated to populate a given variable field within the XML package that is to be sent.

According to the template, some of the variable fields of the XML package are filled dynamically from data inserted by the user into edit boxes presented on the display of the mobile device 10. The template includes placeholders delimited by square brackets, i.e., "[" and "]". These placeholders reference a data source from which data for filling the corresponding section of the template should be obtained. A suitable data source might be a user interface field on the current screen, a user interface field on a previous screen or a table in a device-based logical database. The virtual machine 24, after reading the data source name, searches for the field corresponding to the referenced data source and replaces the placeholder with data contained within the named field. For example, the SUBJECT attribute of the <MAIL> tag in the first XML portion 92 references [NewMsg.Subject]. As such, content for the SUBJECT attribute may be read from the edit box (field) named "Subject" on the screen named "NewMsg". This process is repeated for each such placeholder, until the virtual machine 24, reading through the template, has replaced all placeholders in the template with content to form an XML package.

An exemplary XML package 94, containing data obtained as a result of input provided to the fields of the "NewMsg" screen, is illustrated in FIG. 14. The exemplary XML package 94 may have been created responsive to user interaction with the "NewMsg" screen, which user interaction may be considered to have been culminated by interaction with the OK button 90 (see FIG. 12) corresponding to XML tag D in the first XML portion 92. In this case, the user has entered: the text "steven@nextair.com" into the edit box named "To" 84; the text "Hello Back" into the edit box named "Subject" 86; and the text "I am responding to your message" into the edit box named "Body" 88.

The virtual machine 24, using the template, inspects these three edit boxes and places the text contained within each edit box in the appropriate position in the template. For example, the placeholder [NewMsg.Subject] is replaced by "Hello Back". The virtual machine 24 creates the exemplary XML package 94 by invoking functionality embedded within an XML builder software object to populate the variable fields of the template contained in the first XML portion 92. Once the exemplary XML package 94 has been assembled in this fashion, a relevant method of the message server object is invoked to transmit the exemplary XML package 94 across the network.

When an XML package is received, the event handler 65 of the virtual machine 24 is notified. In response, the virtual machine 24 the XML parser 61 to build a list of name value pairs contained within the received XML package. Thereafter, methods within an object class for processing incoming XML packages are invoked that allow the virtual machine 24 to inspect the XML package to determine a server-side application to associate with the XML package and select a corresponding application definition file. The methods within the object class for processing incoming XML packages also allow the virtual machine 24 to inspect the application definition file to identify the fields in the device-based logical database and the user interface screens that may need to be updated with new data received in the XML package. In the case wherein the user interface screens are updated, such updating may be accomplished according to the procedures normal to the particular device.

Handling of incoming XML packages is defined in the application definition file 28. That is, for each of the possible XML packages that can be received, the application description file 28 includes definitions of device-based logical database tables and screen items that should be updated, as well as which section of the package updates which device-based logical database table or screen item. After an XML package has been received, the event handler 65 uses rules based on the application description file 28 to identify which device-based logical database tables or screen items need to be updated.

FIGS. 15A-15C illustrate how the format of the logical database in the local storage 26 on the device 10, and the XML packages that update the logical database, are defined in the application definition file 28. A second XML portion 96 of the application definition file 28, illustrated in FIG. 15A, forms part of the local data definition section 52 (see FIG. 4). The second XML portion 96 defines an example format for a portion of the logical database related to the e-mail application interface described with reference to FIGS. 12 and 13.

Two example tables are defined in the second XML portion 96 of FIG. 15A for formatting the logical database for the e-mail application. A first XML item E of the second XML portion 96 corresponds to a first table, labeled "SENT-ITEMS" in FIG. 15B. A second XML item F of the second XML portion 96 corresponds to a second table, labeled "RECIPIENTS" in FIG. 15B. The first table stores details of sent e-mail messages and has four fields. The second table stores recipients of sent e-mail messages and has three fields.

FIGS. 15A and 15B illustrate the use of the local storage 26 to store data related to XML packages that are sent and received. Specifically, the first table, defined by the first XML item E in FIG. 15A, may store the e-mail message contained in the exemplary XML package 94, shown in FIG. 14. Accordingly, the application definition file 28 for the e-mail application may be required to contain, along with the first XML portion 92 and the second XML portion 96, a third XML portion 102, illustrated in FIG. 15C. The third XML portion 102 defines how the data packages, composed according to the template included in the first XML portion 92 (see FIG. 13), lead to updates of the tables defined by the second XML portion 96.

The third XML portion 102 includes a first section 104 and a second section 106. The first section 104 defines how fields of a received XML package may be used to update the first table of FIG. 15B. An example line 108 defines how the "MSGID" field of the received XML package may be used to update a field named "LNGMESSAGEID" in the first table of FIG. 15B. Similarly, the second section 106 defines how the fields of the received XML package may be used to update fields of the second table of FIG. 15B.

The third XML portion 102 is contained by an <AXDATAPACKET></AXDATAPACKET> tag pair. Attributes of the <AXDATAPACKET> tag provide rules that instruct the virtual machine 24 as to whether data contained within an XML package of a given XML package type should be used to update tables in the device-based logical database. These rules may be applied whenever an XML package of the given XML package type is sent or received.

As can be seen from the preceding description and example, such an approach has significant advantages over traditional methods of deploying applications onto mobile devices. First, the definition of an application's functionality is separated from the details associated with implementing such functionality, thereby allowing the implementers of a mobile application to concentrate on the functionality and ignore implementation details. Second, application definition files can be downloaded wirelessly, wherever the device happens to be at the time at which the functionality is required. This greatly improves the usefulness of the mobile device, by removing reliance on returning the device to a cradle and running a complex installation program. Third, the use of application definition files allows flexible definitions for numerous applications. Server-side applications may be easily ported to a number of device types.

Notably, mobile communication devices of the current generation may act not only as a mobile telephone, but also may execute an e-mail client application, a personal information manager (PIM) application, a digital photo organizer application, etc. There are often many, widely varied options that may be configured. While some of the options are related to personalization of the mobile device, proper configuration of other options may be essential to a proper interaction between the mobile device and an enterprise with which a user of the mobile device is associated.

When a new mobile device is issued to an individual associated with the enterprise, an information technology (IT) specialist may be given the task of configuring the new mobile device for use with the enterprise. To this end, the IT specialist may be required to navigate multiple screens on the new mobile device to set communications or other device settings.

In view of the above disclosure, the IT specialist may be required to separately request an application definition file for each server-side application of potentially many server-side applications with which the new mobile device is expected to interact.

In another scenario, an employee with a previously personalized and configured mobile device may require that a replacement mobile device be similarly personalized and configured. The replacement mobile device may be required due to the loss of a previous mobile device, software or hardware failure of the previous mobile device or merely a hardware upgrade from the previous mobile device to a newer mobile device.

Such personalization and configuration of mobile devices, though beneficial, may be considered tedious and time consuming.

In overview, the use of application definition files, as disclosed above, allows for a record to be maintained at the middleware server 44 of any application definition files provided to a given user. Furthermore, the given user may be grouped with other users with which the given user shares some commonality, be it a common managerial stratum, a common supervisor or a common rate plan.

A mobile device may trigger automatic mobile device configuration by performing an initial registration process with the middleware server 44. Such an initial registration process may, for instance, involve the virtual machine 24 (see FIG. 2) executed at the first exemplary mobile device 10 (see FIG. 1 and FIG. 3) formulating and transmitting a registration request 1602 (see FIG. 16) to the middleware server 44.

Figure 17:
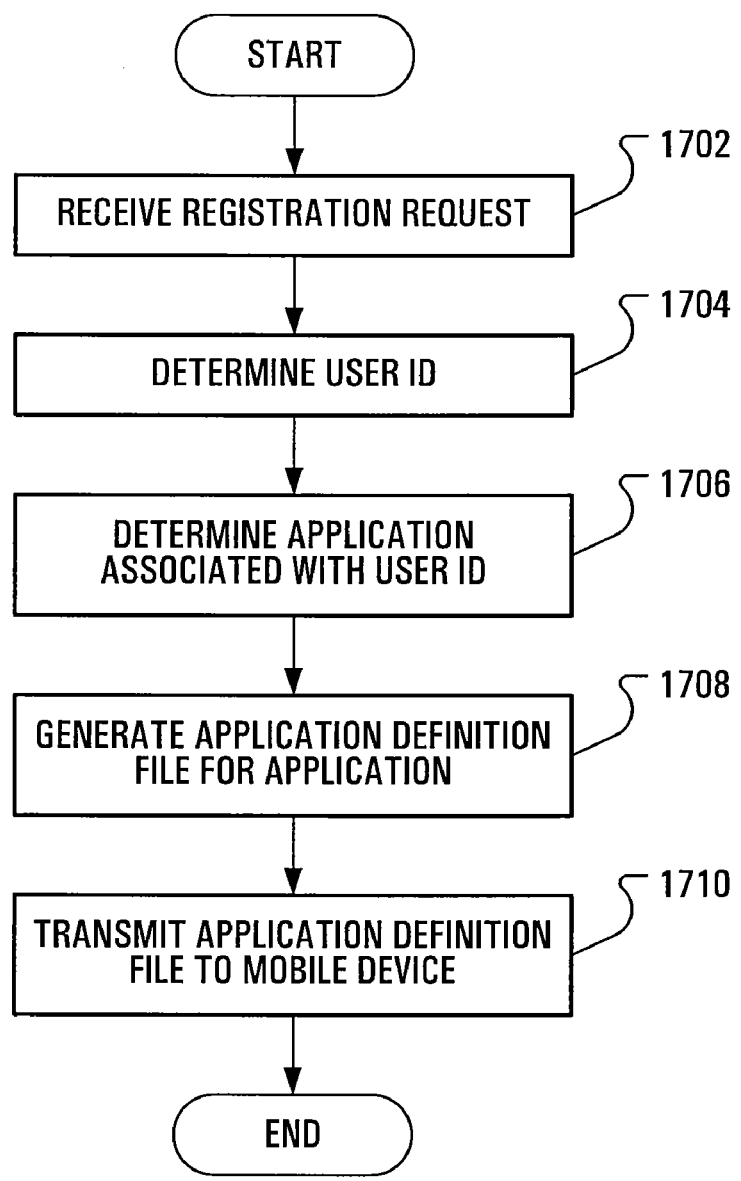
FIG. 17 illustrates exemplary steps of a method of automatically configuring a mobile device according to an embodiment of the present application.

In view of FIG. 17, the middleware server 44 receives (step 1702) the registration request. In particular, in an exemplary case similar to the receipt of a request detailed above, the registration request passes from the first exemplary mobile device 10 to the first network gateway 40 over the first wireless network 36 (see FIG. 3). The first network gateway 40, which may be part of the data network 63 illustrated in FIG. 6, passes the registration request to the middleware server 44. The network interface hardware 66 of the middleware server 44 receives the registration request and stores the registration request in the memory 64 such that the registration request is available for processing by the processor 60.

Processing of the registration request may, for example, involve the processor 60 determining the user ID (step 1704) associated with the device that formulated the registration request. Such a user ID may be arranged to be part of a registration request that conforms to a standard for such requests. For instance, the user ID may be contained in a User ID field of the registration request or, where the registration request is formed in XML or a variant thereof, the registration request may include a User ID element. In either case, the middleware server 44 may parse the received registration request to determine the associated user ID.

Once the processor 60 has determined the user ID for a given registration request, the processor 60 may, based on the user ID, determine (step 1706) a set of N server-side applications that have been previously associated with the user ID, say, in the server database 46 (see FIG. 6). The previous association between user ID and server-side applications may be manually established by an administrator of the middleware server 44 or automatically established through historical monitoring of requests made by a mobile device associated with the user ID.

The processor 60 may then generate (step 1708) an application definition file for the mobile device for each of the server-side applications in the determined set. Generation of an application definition file (step 1708) has been described above in conjunction with the description of FIG. 4 and FIG. 5 to involve determination of a device type for the mobile device requesting the application definition file and the addition of the type-appropriate user interface definition section 48 to the network transactions definition section 50 and the local data definition sections 52.

Once the first application definition file is generated, the middleware server 44 may transmit (step 1710) the first application definition file 1604-1 (see FIG. 16) to the mobile device. Once the second application definition file is generated, the middleware server 44 may transmit (step 1710) the second application definition file 1604-2 (see FIG. 16) to the mobile device. Such generation (step 1708) and transmission (step 1710) may continue until the Nth application definition file 1604-N has been generated (step 1708) and transmitted (step 1710) to the mobile device.

The administrator of the middleware server 44 may independently determine the set of applications appropriate to the user and save the record of the set of applications in the database 46 in association with the user ID of the user. Alternatively, the administrator may establish a single record of the set of applications to associate with users that have common properties and, consequently, common application requirements. In such a case, the administrator may create a Group Listing record, wherein the user IDs of the members of the group are listed. The Group Listing record may be associated with an Application Listing record, which identifies applications that are to be associated with the user IDs listed in the Group Listing record. As such, more efficient associations are possible.

Beyond the application definition files that are associated with server-side applications, there may exist application definition files that provide various settings for the mobile device.

In a first example, an application definition file may provide the mobile device with a particular telephone number that a device is to use for a dial-up connection to a specific network. Alternatively, an application definition file may provide a particular Internet Protocol (IP) address to which the device is to connect as a point of server connection. For instance, a user may need to connect to a particular computer, at the particular IP address, that is in a designated demilitarized zone. In computer security terminology, a demilitarized zone is a network area that sits between an organization's internal network and an external network, usually the Internet. The user may need to connect to the particular computer for business transactions, so, after an initial login, the user may want to be re-configured/re-directed to a different entry point to the corporate LAN.

In another example, an application definition file may provide the mobile device with an address for a Virtual Private Network (VPN) server that provides secure, authenticated network connections. For instance, the user may be required to be authenticated before being able to access a Local Area Network (LAN) for access to corporate applications. The application definition file may also provide encryption key settings and an indication of an authentication protocol (HTTP, LDAP, NT, etc.).

The mobile device may regularly establish a connection to a server gateway. Based on a type for the connection being established to the server gateway, an optimized protocol may be selected. The optimized protocol may be, for instance, the known Transport Control Protocol/Internet Protocol (TCP/IP) or the User Datagram Protocol. The decision of which protocol to use may be, for instance, based on whether the mobile device is establishing the connection to the server gateway over a Wide Area Network, over a public wireless network or over a private WiFi network. In addition, a separate configuration may be required for each network, if the device supports roaming between these different technologies. An application definition file may provide the mobile device with a mapping between type of connection and optimized protocol. Additionally, the application definition file may provide the mobile device with configuration details for each of the protocols.

In a further example, an application definition file may provide the mobile device with configuration details for delivery mechanisms. The most efficient data delivery mechanism may depend on aspects of the server-side applications with which the mobile device is to interact. As such, in addition to configuration details for delivery mechanisms, the application definition file may provide an indication of delivery mechanism to use for interaction with a particular server-side application.

For instance, if the server-side application is to provide the mobile device with instant notification of new data, a push protocol may be used as the delivery mechanism. Exemplary push protocols include UDP hole punching and the Push Access Protocol. Network Address Translator traversal through UDP hole punching is a method for establishing bidirectional UDP connections between Internet hosts in private networks using Network Address Translation. The Push Access Protocol is a protocol defined in WAP-164 of the Wireless Application Protocol suite from the Open Mobile Alliance. In the case of UDP push, a keep alive "beacon" may be required to keep port mappings alive in public wireless gateways.

In contrast, if the server-side application is to provide the mobile device with non-critical updating of data, a simple pull protocol may be used as the delivery mechanism. Exemplary pull protocols include the Hypertext Transfer Protocol and the Simple Object Access Protocol. It should be clear to a person of ordinary skill that other client request response technologies could be used. In the case of the pull protocols, the application definition file may provide an indication of a polling interval of a certain time duration. The mobile device using a pull protocol for the delivery mechanism may transmit a request for an update in a background process. Subsequent request transmissions may be separated in time by the polling interval.

In a still further example, an application definition file may provide the mobile device with configuration details for a particular mechanism for dealing with out of coverage scenarios on the mobile device. For example, the configuration details may indicate whether the device should attempt to re-connect after the device has been disconnected. Additionally, the configuration details may indicate a value for a number of times the device try to re-connect before alerting the user. Furthermore, the configuration details may indicate duration for the time between re-connection attempts. Alternatively, the configuration details may indicate that the device is to notify the user whenever the device goes out of network coverage so that the user may be responsible for attempting to re-establish a connection.

Further configuration settings, such as distinctive ringing, background color or pattern, server address for multimedia messaging, etc., may also be provided in an application definition file. Additional configuration settings may include, for example, use of a predetermined retry rate, use of encryption, use of an alarm to indicate that there are more than five items in an outbound queue, use of a Secure Sockets Layer (SSL).

Advantageously, IT staff are relieved from having to configure each device manually and request each application definition file manually. Upon registration, a relatively uninformed field user can quickly have a properly configured mobile device, e.g., after accidentally erasing all memory on the device.

Conveniently, a field user may upgrade from old mobile device hardware to new mobile device hardware or otherwise switch mobile device hardware and, through mechanisms representative of aspects of the present application, the new mobile device hardware may be configured to have access to the same server-side applications as were accessed by the old mobile device hardware.

It will be understood that the invention is not limited to the embodiments described herein which are merely illustrative of an embodiment of carrying out the invention, and which is susceptible to modification of form, arrangement of parts, steps, details and order of operation. The invention, rather, is intended to encompass all such modification within its scope, as defined by the claims.

We claim:

1. A method of configuring a mobile communication device, said method comprising:
   receiving a request for registration of a mobile communication device;
   determining an identity of a user associated with said mobile communication device;
   determining a set of N server-side applications associated with said identity of said user,
   where N is an integer greater than one; and
   automatically, for each of said N server-side applications:
      generating a document in a markup language, said document for configuring said mobile communication device to access said server-side application; and
      transmitting said document to said mobile communication device.

2. The method of claim 1 wherein said determining said identity of said user comprises parsing said request for registration.

3. The method of claim 1 wherein said determining said set of N server-side applications comprises:
   determining an identity of a group listing that includes said identity of said user; and
   identifying a plurality of application identities associated with said group listing.

4. The method of claim 1 wherein said generating said document comprises combining:
   a format of a user interface to said server-side application at said mobile communication device;
   a format of network messages for exchange of data generated by said server-side application; and
   a format for storing data related to said server-side application at said mobile communication device.

5. The method of claim 4 further comprising, before said combining:
   determining a type for said mobile communication device; and
   selecting said format of said user interface based on said type.

6. The method of claim 1 wherein said generating said document comprises providing a telephone number.

7. The method of claim 6 wherein said telephone number is associated with a network entity with which said mobile communication device is to form a dial-up connection to gain access to said server-side application.

8. The method of claim 1 wherein said generating said document comprises providing an Internet Protocol address.

9. The method of claim 8 wherein said Internet Protocol address is associated with a server with which said mobile communication device is to form a connection to gain access to said server-side application.

10. The method of claim 8 wherein said Internet Protocol address is associated with a Virtual Private Network server with which said mobile communication device is to form a connection to gain access to said server-side application.

11. The method of claim 10 wherein said generating said document further comprises providing encryption key settings.

12. The method of claim 10 wherein said generating said document further comprises providing an indication of an authentication protocol.

13. The method of claim 1 wherein said generating said document comprises providing an indication of a protocol for use in connecting to a server gateway which said mobile communication device is to form a connection to gain access to said server-side application, where said protocol is optimized for a predetermined type of connection to said server gateway.

14. The method of claim 1 wherein said generating said document comprises providing an indication of a delivery mechanism to use for interaction with said server-side application.

15. The method of claim 14 wherein said delivery mechanism is a push protocol.

16. The method of claim 14 wherein said delivery mechanism is a pull protocol.

17. The method of claim 1 wherein said generating said document comprises providing an indication of a mechanism for re-establishing a connection once said connection has been lost, where said connection allows access to said server-side application.

18. A computing device comprising:
   a processor;
   memory in communication with said processor, storing software that, when executed by said processor, adapts said device to:
      receive a request for registration of a mobile communication device;
      determine an identity of a user associated with said mobile communication device;
      determine a set of N server-side applications associated with said identity of said user, where N is an integer greater than one; and
      automatically, for each of said N server-side applications:
         generate a document in a markup language, said document for configuring said mobile communication device to access said server-side application; and
         transmit said document to said mobile communication device.

19. A computer readable medium storing computer-executable instructions that, when performed by a processor of a computing device, cause said computing device to:
   receive a request for registration of a mobile communication device;
   determine an identity of a user associated with said mobile communication device;
   determine a set ofN server-side applications associated with said identity of said user, where N is an integer greater than one; and
   automatically, for each of said N server-side applications:
      generate a document in a markup language, said document for configuring said mobile communication device to access said server-side application; and
      transmit said document to said mobile communication device.

* * * * *

UNITED STATES PATENT AND TRADEMARK OFFICE
CERTIFICATE OF CORRECTION

| | | |
|---|---|---|
| PATENT NO. | : 7,779,085 B2 | Page 1 of 1 |
| APPLICATION NO. | : 11/457841 | |
| DATED | : August 17, 2010 | |
| INVENTOR(S) | : Tim Neil, Steve Grenier and Scott Neil | |

It is certified that error appears in the above-identified patent and that said Letters Patent is hereby corrected as shown below:

Column 22, Line 55, "determine a set ofN server-side applications" should read
--determine a set of N server-side applications--.

Signed and Sealed this
Nineteenth Day of June, 2012

David J. Kappos
*Director of the United States Patent and Trademark Office*